(12) United States Patent
Ichihara et al.

(10) Patent No.: US 11,009,754 B2
(45) Date of Patent: May 18, 2021

(54) DECORATIVE SHEET, LIQUID CRYSTAL DISPLAY DEVICE AND AUTOMOBILE INTERIOR MATERIAL

(71) Applicant: FUJIFILM Corporation, Tokyo (JP)

(72) Inventors: Nobuhiko Ichihara, Minami-Ashigara (JP); Yujiro Yanai, Minami-Ashigara (JP); Rikio Inoue, Minami-Ashigara (JP); Michio Nagai, Minami-Ashigara (JP); Jun Takeda, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 146 days.

(21) Appl. No.: 16/289,038

(22) Filed: Feb. 28, 2019

(65) Prior Publication Data

US 2019/0196245 A1 Jun. 27, 2019

Related U.S. Application Data

(63) Continuation of application No. PCT/JP2017/031465, filed on Aug. 31, 2017.

(30) Foreign Application Priority Data

Sep. 1, 2016 (JP) .............................. JP2016-171140
Oct. 12, 2016 (JP) .............................. JP2016-200848
(Continued)

(51) Int. Cl.
*G02F 1/1347* (2006.01)
*G02B 5/30* (2006.01)
(Continued)

(52) U.S. Cl.
CPC ............ *G02F 1/13473* (2013.01); *B32B 7/02* (2013.01); *G02B 5/30* (2013.01); *G02F 1/133533* (2013.01); *G02F 1/133543* (2021.01)

(58) Field of Classification Search
None
See application file for complete search history.

(56) References Cited

U.S. PATENT DOCUMENTS

| 5,506,704 A * | 4/1996 | Broer | ................... G02B 5/3016 252/299.7 |
| 5,541,745 A * | 7/1996 | Fergason | ............ G02F 1/13362 349/194 |

(Continued)

FOREIGN PATENT DOCUMENTS

| CN | 103298623 A | 9/2013 |
| CN | 105474291 A | 4/2016 |

(Continued)

OTHER PUBLICATIONS

International Preliminary Report on Patentability and Written Opinion of the International Searching Authority, dated Mar. 14, 2019, for International Application No. PCT/JP2017/031465, English translation of the Written Opinion of the International Searching Authority.

(Continued)

*Primary Examiner* — Edward J Glick
*Assistant Examiner* — David Y Chung
(74) *Attorney, Agent, or Firm* — Birch, Stewart, Kolasch & Birch, LLP

(57) ABSTRACT

An object of the present invention is to provide a decorative sheet exhibiting high lustrousness even when observed from a direction deviated from a specular reflection of illumination light, and a liquid crystal display device and an automobile interior material each using the decorative sheet. The object is achieved by a decorative sheet including a cholesteric liquid crystal layer having wavelength-selective reflectivity and satisfying Expression (1), $R[-45,20](\lambda 1)/R[-45,20](\lambda 2) \geq 5$   Expression (1).

15 Claims, 4 Drawing Sheets

(30) Foreign Application Priority Data

Mar. 16, 2017 (JP) .............................. JP2017-051263
Jul. 11, 2017 (JP) .............................. JP2017-135538

(51) Int. Cl.
  *B32B 7/02* (2019.01)
  *G02F 1/1335* (2006.01)

(56) References Cited

U.S. PATENT DOCUMENTS

| | | | |
|---|---|---|---|
| 2005/0035353 A1* | 2/2005 | Adachi | H01L 51/5281 257/72 |
| 2013/0027641 A1* | 1/2013 | Kodama | G02F 1/133502 349/96 |
| 2013/0329166 A1 | 12/2013 | Poliakine et al. | |
| 2015/0369983 A1* | 12/2015 | Oki | G02B 5/3016 349/193 |
| 2016/0091756 A1 | 3/2016 | Watano et al. | |
| 2016/0154156 A1* | 6/2016 | Ichihashi | G01J 1/0429 356/364 |
| 2016/0178964 A1 | 6/2016 | Sakai | |
| 2016/0342003 A1 | 11/2016 | Takeda et al. | |
| 2017/0115208 A1 | 4/2017 | Ichihashi | |
| 2017/0203693 A1* | 7/2017 | Oishi | B60R 1/00 |
| 2017/0336555 A1 | 11/2017 | Yanai et al. | |

FOREIGN PATENT DOCUMENTS

| | | |
|---|---|---|
| JP | 6-186534 A | 7/1994 |
| JP | 2014-79944 A | 5/2014 |
| JP | 2016-4212 A | 1/2016 |
| JP | 2016-71078 A | 5/2016 |
| JP | 2016-149984 A | 8/2016 |
| KR | 10-2016-0052465 A | 5/2016 |
| WO | WO 2015/000534 A1 | 1/2015 |
| WO | WO 2015/122479 A1 | 8/2015 |
| WO | WO 2016/009974 A2 | 1/2016 |
| WO | WO 2016/129645 A1 | 8/2016 |

OTHER PUBLICATIONS

International Search Report, dated Nov. 14, 2017, for International Application No. PCT/JP2017/031465, with an English translation.
Extended European Search report dated Sep. 3, 2019, for European Patent Application No. 17846682.7.
Korean Office Action, dated Nov. 14, 2019, for Korean Application No. 10-2019-7004452, along with an English translation.
Chinese Office Action and Search Report dated Aug. 27, 2020 for Application No. 201780053698.5 with an English translation of the Office Action.

* cited by examiner

DECORATIVE SHEET, LIQUID CRYSTAL DISPLAY DEVICE AND AUTOMOBILE INTERIOR MATERIAL

CROSS-REFERENCE TO RELATED APPLICATIONS

This application is a Continuation of PCT International Application No. PCT/JP2017/031465 filed on Aug. 31, 2017, which claims priority under 35 U.S.C. § 119(a) to Japanese Patent Application No. 2016-171140 filed on Sep. 1, 2016, Japanese Patent Application No. 2016-200848 filed on Oct. 12, 2016, Japanese Patent Application No. 2017-051263 filed on Mar. 16, 2017 and Japanese Patent Application No. 2017-135538 filed on Jul. 11, 2017. Each of the above applications is hereby expressly incorporated by reference, in its entirety, into the present application.

BACKGROUND OF THE INVENTION

1. Field of the Invention

The present invention relates to a decorative sheet, and a liquid crystal display device and an automobile interior material including the decorative sheet.

2. Description of the Related Art

A so-called metallic luster decorative sheet that reflects light in the visible light region is used, for example, on the surfaces of molded articles such as home appliances, office equipment, automobile parts, and the like.

As such a decorative sheet, a resin sheet containing metal particles has been used for imparting a metallic luster appearance, but alternative materials have been desired from the viewpoint of environmental load caused by use of heavy metals, or risk of causing radio disturbance when used for communication equipment such as mobile phones.

Incidentally, as a decorative material such as a decorative sheet, use of a cholesteric liquid crystalline film capable of imparting an appealing appearance with high reflection lustrousness and spectral characteristics has been studied. As the decorative material to be used, JP1994-186534A (JP-H6-186534A) proposes a method of producing a cholesteric liquid crystalline film characterized by cholesterically aligning a liquid crystalline composition in a liquid crystal state on an alignment film formed on a translucent substrate, and forming a film formed of a liquid crystalline polymer that is in a glass state at a temperature below a liquid crystal transition point, for example.

SUMMARY OF THE INVENTION

However, in the conventional cholesteric liquid crystalline film, the lustrousness was high when observed from the specular reflection direction of the illumination light, but sufficient lustrousness was not obtained when observed from a direction deviated from specular reflection.

Accordingly, an object of the present invention is to provide a decorative sheet exhibiting high lustrousness even when observed from a direction deviated from a specular reflection of illumination light, and a liquid crystal display device and an automobile interior material each using the decorative sheet.

As a result of intensive investigation by the inventors of the present invention, it has been found that, it is possible to provide a decorative sheet exhibiting high lustrousness even when observed from a direction deviated from the specular reflection of the illumination light by setting the reflectance of a decorative sheet including a cholesteric liquid crystal layer having wavelength-selective reflectivity for light with a certain incident angle and a certain light-receiving angle and at a peak wavelength of the characteristic reflectance and a wavelength deviated from the peak wavelength within a certain range. Further, the inventors of the present invention have also found that by using this decorative sheet, it is possible to provide a liquid crystal display device excellent in designability and an automobile interior material that can prevent reflected glare of a dashboard on a windshield.

That is, it has been found that the above object can be achieved by the configuration shown below.

[1] A decorative sheet comprising a cholesteric liquid crystal layer having wavelength-selective reflectivity which satisfies Expression (1), $$R[-45,20](\lambda 1)/R[-45,20](\lambda 2) \geq 5 \qquad \text{Expression (1)}$$

here, $R[-45,20](\lambda)$ represents characteristic reflectance at a wavelength $\lambda$ of incident light with a polar angle of $-45°$ with respect to the decorative sheet, the reflectance being measured at a light-receiving angle expressed by a polar angle of $20°$ at an azimuthal angle shifted $180°$ from an azimuthal angle of the incident light, $\lambda 1$ represents a peak wavelength of characteristic reflectance in a wavelength of 380 nm to 780 nm measured in such a manner that light is incident from a viewing-side surface of the decorative sheet, and $\lambda 2$ is set to replace one of $\lambda 21$ or $\lambda 22$ ($\lambda 21=\lambda 1+200$ nm and $\lambda 22=\lambda 1-200$ nm) that results in a smaller value when $R[-45,20](\lambda 21)$ and $R[-45,20](\lambda 22)$ are compared to each other.

[2] The decorative sheet according to [1], which satisfies Expression (2), $$R[-45,20](\lambda 1)/R[-45,15](\lambda 1) \leq 1.7 \qquad \text{Expression (2)}$$

here, $R[-45,15](\lambda)$ represents reflectance at a wavelength $\lambda$ of incident light with a polar angle of $-45°$ with respect to the decorative sheet, the reflectance being measured at a light-receiving angle expressed by a polar angle of $15°$ at an azimuthal angle shifted $180°$ from an azimuthal angle of the incident light.

[3] The decorative sheet according to [1] or [2] including a region A satisfying Expression (3) in a plane of the decorative sheet, $$R_{max}[0,15](\lambda 1)/R_{min}[0,15](\lambda 1) \geq 1.3 \qquad \text{Expression (3)}$$

here, $R_{max}[0,15](\lambda)$ and $R_{min}[0,15](\lambda)$ respectively represent maximum and minimum values of reflectance of incident light with a polar angle of $0°$ with respect to the decorative sheet, the reflectance being measured at a wavelength of $\lambda$ and a light-receiving angle expressed by a polar angle of $15°$ at an azimuthal angle in a range of $0°$ to $360°$.

[4] The decorative sheet according to [3] further including a region B satisfying Expression (4) in a plane of the decorative sheet, $$R_{max}[0,15](\lambda 1)/R_{min}[0,15](\lambda 1) \leq 1.1 \qquad \text{Expression (4)}$$

here, $R_{max}[0,15](\lambda)$ and $R_{min}[0,15](\lambda)$ respectively represent maximum and minimum values of reflectance of incident light with a polar angle of $0°$ with respect to the decorative sheet, the reflectance being measured at a wavelength of $\lambda$ and a light-receiving angle expressed by a polar angle of $15°$ at an azimuthal angle in a range of $0°$ to $360°$.

[5] The decorative sheet according to any one of [1] to [4], in which the decorative sheet is a sheet in which a maximum value of integral reflectance excluding a specular reflection component is 10% or more in the wavelength range of 380 nm to 780 nm.

[6] The decorative sheet according to any one of [1] to [5], in which the cholesteric liquid crystal layer has a striped pattern formed of a bright portion and dark portion in a cross-section observed by a scanning electron microscope, and the striped pattern has a wavy structure in which an average value of peak-to-peak distances is from 0.5 µm to 50 µm, here, the wavy structure is defined as a structure in which there is at least one region M in which the absolute value of an inclination angle in a continuous line formed by the bright portion or the dark portion of the striped pattern with respect to a plane of the cholesteric liquid crystal layer is 5° or more, and a peak or valley in which the region M is sandwiched by two points located closest to the region M with an inclination angle of 0° is specified, the peak-to-peak distance of the wavy structure is defined as a distance obtained by measuring distances between the peaks or valleys in which the region M is sandwiched by two points located closest to the region M with an inclination angle of 0° in a plane direction of the cholesteric liquid crystal layer, and arithmetically averaging the distances in the entire film thickness and a length of 100 µm in the longitudinal axis direction of a cross section of the cholesteric liquid crystal layer.

[7] The decorative sheet according to any one of [1] to [6], in which the cholesteric liquid crystal layer has a striped pattern formed of a bright portion and a dark portion observed in a cross section by a scanning electron microscope, and satisfies Expressions (5) and (6), $$\alpha/\beta \geq 1.2 \quad \text{Expression (5)}$$

$$\alpha \geq 2° \quad \text{Expression (6)}$$

here, $\alpha$ and $\beta$ represent two largest value among standard deviations of inclination angles within 1 µm in one of two surfaces of the cholesteric liquid crystal layer, the inclination angle is defined as an angle between a fine line segment on the continuous line of the bright portion or the dark portion of the striped pattern and a normal direction of the cholesteric liquid crystal layer.

[8] The decorative sheet according to any one of [1] to [7], in which a ratio of an internal haze value (Hi) to a total haze value (Ht) of the decorative sheet is 40% or more.

[9] The decorative sheet according to any one of [1] to [8], in which the cholesteric liquid crystal layer has a surfactant.

[10] The decorative sheet according to any one of [1] to [9], in which the cholesteric liquid crystal layer has a striped pattern formed of bright and dark portions observed in a cross section by a scanning electron microscope, at least one of the bright and dark portions is branched, and regarding branches of the bright and dark portions, there is a bright portion or dark portion having an end portion toward a branched portion between two bright or dark portions among three bright or dark portions extending from the branched portion, and in a case where a structure in which one bright or dark portion between the two bright or dark portions sandwiching the bright or dark portion having an end portion toward the branched portion is included is defined as a structure A, and a structure having three or more bright and dark portions is defined as a structure B, the number of the structures A and B included per a cross sectional area of 100 µm$^2$ of the cholesteric liquid crystal layer satisfies any one of Condition I or Condition II, Condition I: The structure B is not included, and the number of the structure A included is 0.1 or more and less than 50

Condition II: The number of the structure B included is 0.1 or more and less than 10.

[11] The decorative sheet according to any one of [1] to [10], which satisfies Expression (1-1), $$R[-45,20](\lambda 1)/R[-45,20](\lambda 2) > 9 \quad \text{Expression (1-1)}$$

[12] A liquid crystal display device comprising on a surface thereof a composite film including the decorative sheet according to any one of [1] to [11] and a λ/4 retardation plate.

[13] An automobile interior material comprising a composite film including the decorative sheet according to any one of [1] to [11] and a λ/4 retardation plate.

According to the present invention, it is possible to provide a decorative sheet exhibiting high lustrousness even when observed from a direction deviated from a specular reflection direction of illumination light, and a liquid crystal display device excellent in designability and an automobile interior material that can prevent reflected glare of a dashboard on a windshield each using the decorative sheet.

DESCRIPTION OF THE PREFERRED EMBODIMENTS

Hereinafter, the present invention will be described in detail.

Descriptions of the constituent elements described below are sometimes made based on representative embodiments of the present invention, but the present invention is not limited to such embodiments.

In the present specification, numerical ranges expressed preposition "to" means a range including numerical values described before and after "to" as a lower limit value and an upper limit value thereof.

Also, in this specification, parallel and orthogonal does not mean parallel or orthogonal in a strict sense but means a range of ±5° from parallel or orthogonal.

Further, in the present specification, Re(λ) and Rth(λ) respectively represent in-plane retardation and retardation in the thickness direction at wavelength λ. The wavelength λ is set to 550 nm unless specified otherwise. Re (λ) and Rth (λ) in the present specification are values measured at wavelength λ in AxoScan (manufactured by Axometrics). By inputting the average refractive index ((nx+ny+nz)/3) and the film thickness (d (μm)) with AxoScan, Slow axis direction (°)

$$Re(\lambda)=R0(\lambda)$$

$$Rth(\lambda)=((nx+ny)/2-nz)\times d \text{ are calculated.}$$

Note that the numerical value R0(k) displayed on and calculated by AxoScan means Re(λ).

Further, in the present specification, the term "liquid crystalline composition and liquid crystalline compound" includes ones that no longer exhibits liquid crystallinity due to curing or the like.

<Decorative Sheet>

Figure 1:
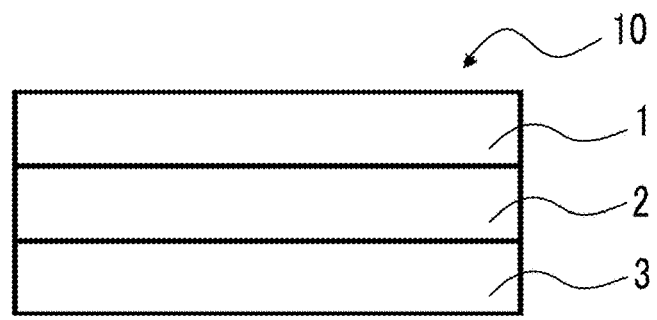
FIG. 1 is a schematic cross sectional view showing an example of an embodiment of a decorative sheet of the present invention.

FIG. 1 is a schematic cross sectional view showing an example of an embodiment of the decorative sheet of the present invention. A decorative sheet 10 of the present invention has a cholesteric liquid crystal layer 1 having wavelength-selective reflectivity. Further, the decorative sheet may have an undercoat layer 2 and a support 3. The decorative sheet 10 of the present invention has a viewing-side surface and a non-viewing-side surface opposite to the viewing-side surface.

The decorative sheet 10 of the present invention may have a pattern shape in which a portion satisfying the requirements of the present invention and a portion not satisfying the requirements are mixed in the surface of the sheet. For example, it is also preferable to form a decorative potion (exhibiting lustrousness) satisfying the requirements of the present invention by matching various kinds of information such as character information and image information to a patterning so as to enhance designability.

Examples of the method of partially forming a decorative portion include applying a cholesteric liquid crystal layer with a mask (no liquid crystal layer applied on the mask portion), forming an isotropic layer in a part of uniformly coated cholesteric liquid crystal layer by changing the temperature or the like, and drawing the cholesteric liquid crystal layer by ink jet, but not limited thereto.

The decorative sheet 10 of the present invention may have a plurality of reflection regions whose characteristic reflection peak wavelengths are different in the sheet surface or may have a region in which a plurality of the cholesteric liquid crystal layers 1 having different characteristic reflection peak wavelengths are laminated. Examples thereof include transfer-laminating a plurality of decorative sheets having different reflection wavelengths, drawing cholesteric liquid crystal layers having different amounts of chiral agent in the sheet surface multiple times by ink jet, but not limited thereto.

In a case where the decorative sheet 10 of the present invention has various pattern shapes, the shapes may be any and are not particularly limited to certain figures, characters and the like. The shape of each region is not particularly limited, and various shapes such as a stripe shape, a dot shape, and a mosaic shape may be used.

The size of each reflection region is not particularly limited. The reflection regions may have a fine structure such that the reflected light therefrom can be observed as a whole.

The reflection regions may be in contact with each other or may be separated from each other.

The decorative sheet 10 of the present invention may further include any one or a combination of a light transmitting region, a light reflecting layer, a light absorbing layer, an ultraviolet absorbing layer, an antireflection layer, and the like.

The decorative sheet 10 of the present invention is not limited to a flat sheet, and may be processed into a three-dimensional shape. For processing into a three-dimensional shape, stretching and shrinking and the like may be utilized.

<Liquid Crystal Display Device>

The decorative sheet 10 of the present invention may also be used as a decorative material having high applicability by being used in combination with a λ/4 retardation plate.

For example, in a case where a surface of the liquid crystal display device (display) is decorated with the decorative sheet of the present invention via the λ/4 retardation plate, decoration with unique designability which allows the color of the decorative sheet to be visible only when the display is turned off or in black, and when white is displayed, the decorative sheet to be transparent and unnoticeable is realized. That is, according to the liquid crystal display device of the present invention including the composite film having the decorative sheet 10 of the present invention and the λ/4 retardation plate on a surface (image display surface), a liquid crystal display device with unique designability which allows the color of the decorative sheet 10 to be visible only when the display device is turned off or in black, and when white is displayed, the decorative sheet to be transparent and unnoticeable is realized.

Further, the composite film having the decorative sheet 10 and the λ/4 retardation plate of the present invention can also be utilized as a reflective plate such as a reflective liquid crystal display device and a semi-transmissive liquid crystal display device.

Furthermore, since the decorative sheet 10 of the present invention has an advantageous feature that the decorative sheet is visually recognized as a decorative material and the back side cannot be seen through in a case where the viewer side is bright through a film like a half mirror, and is visually recognized as a transparent film in a case where the back side is bright, and thus unique designability can be imparted.

<Automobile Interior Material>

Similarly, by combining the λ/4 retardation plate and the decorative sheet 10 of the present invention and using the side of the decorative sheet 10 for decorating the dashboard under the windshield of the car, reflected glare of the dashboard on a windshield can be resolved. That is, according to the interior material of the automobile interior of the present invention having the composite film having the decorative sheet 10 and the λ/4 retardation plate of the present invention, reflection of the dashboard on the windshield can be eliminated.

Further, the composite film having the decorative sheet 10 and the λ/4 retardation plate of the present invention is not limited to those applications, but may be utilized for various applications for the purpose of preventing objects applied to decoration from being reflected on a reflector.

In the present invention, the in-plane retardation Re of the λ/4 retardation plate is not particularly limited, but the λ/4 retardation plate preferably has an in-plane retardation Re(550) at a wavelength of 550 nm of 115 nm to 165 nm, more preferably 120 nm to 150 nm, and even more preferably 125 nm to 145 nm.

The retardation Rth in the thickness direction of the λ/4 retardation plate is not particularly limited, but the λ/4 retardation plate preferably has a retardation in the thickness direction Rth(550) at a wavelength of 550 nm of −200 nm to 200 nm, more preferably −100 nm to 100 nm, and even more preferably −50 nm to 50 nm.

[Reflectance]

The decorative sheet 10 of the present invention satisfies Expression (1).

$$R[-45,20](\lambda 1)/R[-45,20](\lambda 2) \geq 5 \qquad \text{Expression (1)}$$

Here, $R[-45,20](\lambda)$ represents reflectance at a wavelength $\lambda$ of incident light with a polar angle of −45° with the decorative sheet 10, the reflectance being measured at a light-receiving angle expressed by a polar angle of 20° at an azimuthal angle shifted 180° from an azimuthal angle of the incident light, $\lambda 1$ represents a peak wavelength of reflectance in a wavelength of 380 nm to 780 nm measured in such a manner that light is incident from a viewing-side surface of the decorative sheet 10, and $\lambda 2$ is set to replace one of $\lambda 21$ or $\lambda 22$ ($\lambda 21=\lambda 1+200$ nm and $\lambda 22=\lambda 1-200$ nm) that results in a smaller value when $R[-45,20](\lambda 21)$ and $R[-45,20](\lambda 22)$ are compared to each other.

In a case where Expression (1) is not satisfied, it is impossible to obtain a decorative sheet showing sufficient lustrousness when observed from a direction deviated from specular reflection of illumination light.

More preferably, the decorative sheet 10 of the present invention satisfies Expression (1-1), even more preferably satisfies Expression (1-2), and particularly preferably satisfies Expression (1-3).

$$R[-45,20](\lambda 1)/R[-45,20](\lambda 2) > 9 \qquad \text{Expression (1-1)}$$

$$R[-45,20](\lambda 1)/R[-45,20](\lambda 2) \geq 10 \qquad \text{Expression (1-2)}$$

$$R[-45,20](\lambda 1)/R[-45,20](\lambda 2) \geq 20 \qquad \text{Expression (1-3)}$$

By satisfying Expression (1), it is possible to further enhance lustrousness when observed from a direction deviated from specular reflection of illumination light. In the following description, the expression "lustrousness when observed from a direction deviated from specular reflection of illumination light" will also be referred to as "lustrousness".

There is no particular upper limit for $R[-45,20](\lambda 1)/R[-45,20](\lambda 2)$, but it is preferable that $R[-45,20](\lambda 1)/R[-45,20](\lambda 2)$ satisfies Expression (1-3).

$$R[-45,20](\lambda 1)/R[-45,20](\lambda 2) \leq 500 \qquad \text{Expression (1-3)}$$

Further, the decorative sheet 10 of the present invention preferably satisfies Expression (2).

$$R[-45,20](\lambda 1)/R[-45,15](\lambda 2) \leq 1.7 \qquad \text{Expression (2)}$$

Here, $R[-45,15](\lambda)$ represents reflectance at a wavelength $\lambda$ of incident light with a polar angle of −45° with the decorative sheet 10, the reflectance being measured at a light-receiving angle expressed by a polar angle of 15° at an azimuthal angle shifted 180° from an azimuthal angle of the incident light.

It is preferable that Expression (2) is satisfied because sudden change in reflection intensity due to reflection angle can be suppressed and the texture becomes excellent.

More preferably, the decorative sheet 10 of the present invention more satisfies Expression (2-1).

$$R[-45,15](\lambda 1)/R[-45,15](\lambda 2) \leq 1.5 \qquad \text{Expression (2-1)}$$

Further, it is preferable that the decorative sheet 10 of the present invention includes a region A satisfying Expression (3) in a plane of the decorative sheet 10.

$$R_{max}[0,15](\lambda 1)/R_{min}[0,15](\lambda 1) \geq 1.3 \qquad \text{Expression (3)}$$

Here, $R_{max}[0,15](\lambda)$ and $R_{min}[0,15](\lambda)$ respectively represent maximum and minimum values of reflectance of incident light with a polar angle of 0° to the decorative sheet 10, the reflectance being measured at a wavelength of $\lambda$ and a light-receiving angle expressed by a polar angle of 15° at an azimuthal angle in a range of 0° to 360°.

It is preferable that the region A satisfies Expression (3) because when Expression (3) is satisfied, the reflection intensities changes depending on the azimuthal angle to be viewed, and thus unique designability can be obtained.

The decorative sheet 10 of the present invention more preferably has a region A1 satisfying Expression (3-1).

$$R_{max}[0,15](\lambda 1)/R\min[0,15](\lambda 1) \geq 3 \qquad \text{Expression (3-1)}$$

In addition to having the region A, the decorative sheet 10 of the present invention preferably further has a region B that satisfies Expression (4) in the plane of the decorative sheet 10.

$$R_{max}[0,15](\lambda 1)/R_{min}[0,15](\lambda 1) \leq 1.1 \qquad \text{Expression (4)}$$

Here, $R_{max}[0,15](\lambda)$ and $R_{min}[0,15](2)$ respectively represent maximum and minimum values of reflectance of incident light with a polar angle of 0° to the decorative sheet 10, the reflectance being measured at a wavelength of $\lambda$ and a light-receiving angle expressed by a polar angle of 15° at an azimuthal angle in a range of 0° to 360°.

It is preferable that the region A satisfies Expression (4) because when Expression (4) is satisfied, a region in which the reflection intensities changes depending on the azimuthal angle to be viewed and a region in which the reflection intensities are the same regardless the azimuthal angle to be viewed coexist in the decorative sheet, and thus unique designability can be obtained.

A plurality of regions A and B may exist in the plane of the decorative sheet 10. Also, the shape is not particularly limited. The regions A and B may be disposed randomly or regularly.

<Method of Measuring Reflectance>

In the present invention, the reflectance refers to a value obtained by setting the incident angle (polar angle, azimuthal angle), the light-receiving angle (polar angle, azimuthal angle), and the measurement wavelength range as appropriate so as to cause light to be incident from viewing-side surface of the decorative sheet 10 and measuring the reflectance using a three-dimensional displacement spectrophotometric system (GCMS-3B, manufactured by Murakami Color Research Laboratory).

Further, in a case where the reflectance is outside measurable wavelength range by the above apparatus, a spectral photometer (V-770, manufactured by JASCO Corporation) equipped with an absolute reflectance measuring unit (ARMN-920, manufactured by JASCO Corporation) may be used for the measurement as an alternative.

<Method of Measuring Characteristic Reflectance>

In the present invention, the characteristic reflectance is a value obtained by causing light to be incident from viewing-side surface of the decorative sheet 10 and measuring the reflectance using a large integrating sphere apparatus (ILV-471, manufactured by JASCO Corporation) equipped with a spectral photometer (V-550, manufactured by JASCO Corporation) without using an optical trap such that the light subjected to the measurement includes specular reflection light.

Regarding the peak wavelength of the characteristic reflectance, in a case where the reflection spectrum of the reflection region is measured by the above method, a mountain-like waveform (convex upward) whose wavelength is set as the horizontal axis as waveform of the characteristic reflectance. At this time, the average reflectance (arithmetic mean) of the maximum and minimum values of the characteristic reflectance is obtained, and among the two wavelengths at the two intersections of the waveform and the average reflectance, $\lambda A$ (nm) is set to be the value of the wavelength on the short wave side, $\lambda B$ (nm) is set to be the value of the wavelength on the long wave side, and the peak wavelength of the characteristic reflectance is calculated by the following expression.

$$\text{Peak wavelength of characteristic reflection} = (\lambda A + \lambda B)/2$$

Further, in a case where one of the $\lambda A$ and $\lambda B$, or both $\lambda A$ and $\lambda B$ is outside the wavelength range measurable by the above apparatus, a spectral photometer (V-770, manufactured by JASCO Corporation) equipped with large integrating sphere apparatus (ILN-925, manufactured by JASCO Corporation) may be used for the measurement as an alternative.

[Integral Reflectance Excluding Specular Reflection Component]

The decorative sheet 10 of the present invention is preferably a sheet in which the maximum value of integral reflectance excluding the specular reflection component is 10% or more in the wavelength range of 380 nm to 780 nm. More preferably 30% or more, and even more preferably 40% or more.

By setting the maximum value of integral reflectance in the above range, the lustrousness can be further enhanced.

<Method of Measuring Integral Reflectance Excluding Specular Reflection Component>

In the present invention, the integral reflectance excluding the specular reflection component is a value obtained by causing light to be incident from viewing-side surface of the decorative sheet and measuring the reflectance using a large integrating sphere apparatus (ILV-471, manufactured by JASCO Corporation) equipped with a spectral photometer (V-550, manufactured by JASCO Corporation) using an optical trap such that the light subjected to the measurement does not include specular reflection light.

[Haze Value]

The decorative sheet 10 of the present invention is preferably a sheet in which the ratio of the internal haze value (Hi) to the total haze value (Ht) of the decorative sheet is 40% or more, and more preferably 70% or more.

By setting the maximum value of integral reflectance in the above range, the lustrousness can be further enhanced.

<Method of Measuring Haze>

In the present invention, the total haze value (Ht) and the internal haze value (Hi) are values measured under the following conditions in accordance with JIS K-7136 (2000).

[Device name] Device name: Haze meter NDH 2000 (manufactured by Nippon Denshoku Industries Co., Ltd.)

[Sample size] 50 mm×50 mm

[Measurement environment] 25° C. Relative humidity 55%

[Support]

The support 3 supports the cholesteric liquid crystal layer.

The support 3 used in the present invention may be a single layer or a multilayer. Examples of the support 3 in the case of the single layer include a support made of glass, triacetyl cellulose (TAC), polyethylene terephthalate (PET), polycarbonate, polyvinyl chloride, acrylic, polyolefin, cycloolefin polymer or the like, but not particularly limited thereto. Examples of the support in the case of the multilayer include a substrate including any of the above-described single layer supports and another layer provided on the surface of the substrate. Alternatively, a $\lambda/4$ retardation plate may be used as the support 3.

[Undercoat Layer (Alignment Film)]

Examples of the undercoat layer 2 used in the present invention include an undercoat layer containing a (meth) acrylic polymer resin such as a resin obtained by curing a polyfunctional (meth)acrylic monomer such as pentaerythritol triacrylate and pentaerythritol tetraacrylate, a polyvinyl alcohol resin, a (meth)acrylic polymer resin, a polyolefin resin, a cycloolefin polymer resin, a polycarbonate resin, a polyurethane resin, a polystyrene resin, a polyimide resin, an epoxy resin, a polyester resin, or a polyether resin. A plurality of undercoat layers 2 may be laminated.

In particular, from the viewpoint of the excellent effect of the present invention, the undercoat layer preferably contains a (meth)acrylic polymer resin or a polyvinyl alcohol resin.

Note that the (meth) acrylic polymer resin encompasses an acrylic polymer resin and a methacrylic polymer resin.

The undercoat layer containing a (meth)acrylic polymer resin is preferably a layer formed by curing a composition containing a polyfunctional (meth)acrylic monomer. Although the polyfunctional (meth)acrylic monomer may be any monomer having two or more (meth)acryloyl groups, the number of (meth)acryloyl groups is preferably 2 to 8, more preferably 2 to 6.

Note that the (meth)acryloyl group encompasses an acryloyl group and a methacryloyl group.

The molecular weight of the polyfunctional (meth)acrylic monomer is not particularly limited, but preferably 1000 or less, and more preferably 500 or less. The lower limit is not particularly limited, but 100 or more in general.

A composition containing a polyfunctional (meth)acrylic monomer may contain a polymerization initiator.

Examples of a method of forming the undercoat layer containing the (meth)acrylic polymer resin using the above composition include a method in which a composition containing a polyfunctional (meth)acrylic monomer is applied on a predetermined support to form a coating film, and then the coating film is subjected to curing treatment (for example, photocuring treatment and thermal curing treatment).

As the polyvinyl alcohol resin, a modified polyvinyl alcohol resin into which a predetermined functional group (for example, a polymerizable group) is introduced may be used.

Examples of a method of forming the undercoat layer containing the polyvinyl alcohol resin include a method in which a composition containing a polyvinyl alcohol resin is applied on a predetermined support to form a coating film, and if necessary, the coating film is subjected to drying treatment.

[Cholesteric Liquid Crystal Layer]

The cholesteric liquid crystal layer 1 used in the present invention has a layer formed by fixing cholesteric liquid crystalline phase and exhibits wavelength-selective reflectivity. Light affected by wavelength-selective reflectivity of the cholesteric liquid crystal layer 1 is not particularly limited, and may be any of infrared ray (infrared light), visible light, ultraviolet ray (ultraviolet light), and the like.

The cholesteric liquid crystal layer 1 used in the present invention preferably has a liquid crystalline compound fixed in a cholesteric alignment state. The cholesteric alignment state may be an alignment state that reflects right circularly polarized light, an alignment state that reflects left circularly polarized light, or may include both of the states. The liquid crystalline compound used in the present invention is not particularly limited, and various known ones can be used.

Figure 2:
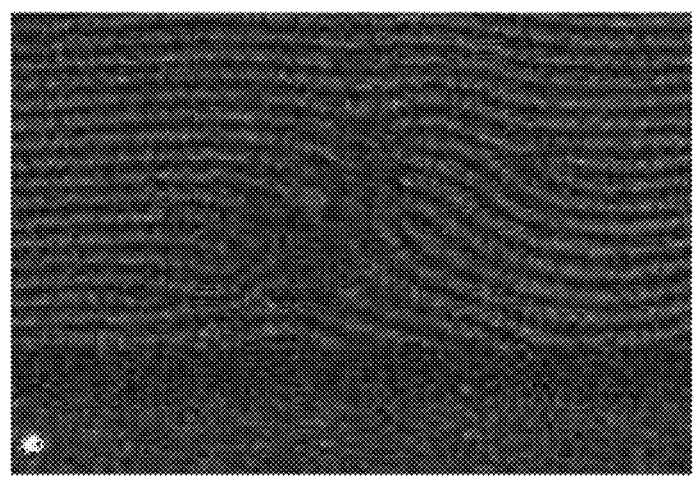
FIG. 2 is a scanning electron microscope of a cross section of an example of a cholesteric liquid crystal layer shown as a reference.

Further, as shown in FIG. 2, the cholesteric liquid crystal layer 1 used in the present invention has a striped pattern between a bright portion and a dark portion when the cross section thereof is observed with a scanning electron microscope (SEM).

Note that the SEM photograph in FIG. 2 is presented merely as a reference of the cross section of an example of a cholesteric liquid crystal layer and does not show the embodiment of the cholesteric liquid crystal layer in the decorative sheet of the present invention.

The striped pattern preferably has a wavy structure, and it is preferable that the average value of the peak-to-peak distances of the wavy structure is 0.5 μm to 50 μm. The average value of the peak-to-peak distances is more preferably 1.5 μm to 10 μm, and still more preferably 2.5 μm to 5.0 μm.

It is preferable that the striped pattern of the bright portion and the dark portion has a wavy structure and the average value of the peak-to-peak distances of the wavy structure is within the above range because lustrousness can be further enhanced.

Figure 3:
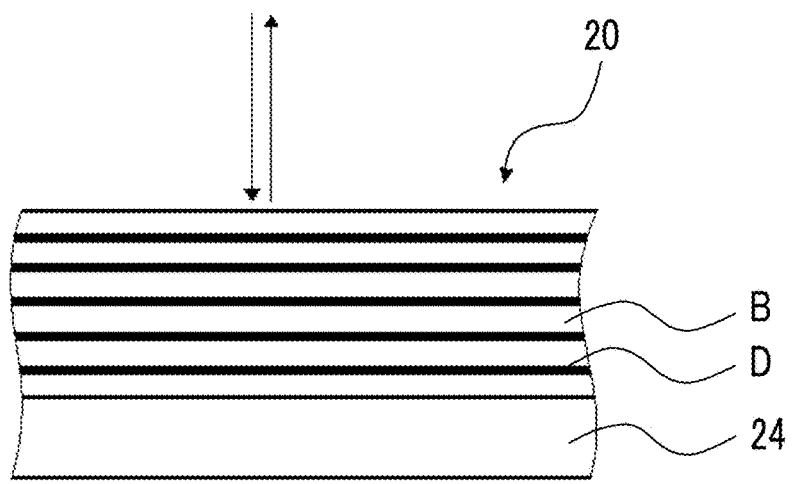
FIG. 3 is a schematic cross sectional view provided for explaining action of reflection of a cholesteric liquid crystal layer.

FIG. 3 shows a schematic cross section of a typical cholesteric liquid crystal layer.

As shown in FIG. 3, in the cross section of the typical cholesteric liquid crystal layer 20, striped patterns formed of a bright portion B and a dark portion D are observed usually. That is, in the cross section of the cholesteric liquid crystal layer 20, a layered structure in which the bright portion B and the dark portion D are alternately laminated is observed. Typically, as shown in FIG. 3, the striped pattern (layered structure) formed of the bright portion B (continuous line formed by the bright portion B) and the dark portion D (continuous line formed by the dark portion D) is formed so as to be parallel to the surface of a support 24, that is, the surface in which the cholesteric liquid crystal layer 20 is formed. In such an aspect, the cholesteric liquid crystal layer 20 exhibits specular reflectivity. That is, in a case where light is incident from the normal direction of the cholesteric liquid crystal layer 20, light is reflected in the normal direction, but light is hardly reflected in the oblique direction (see arrows in FIG. 3).

Figure 4:
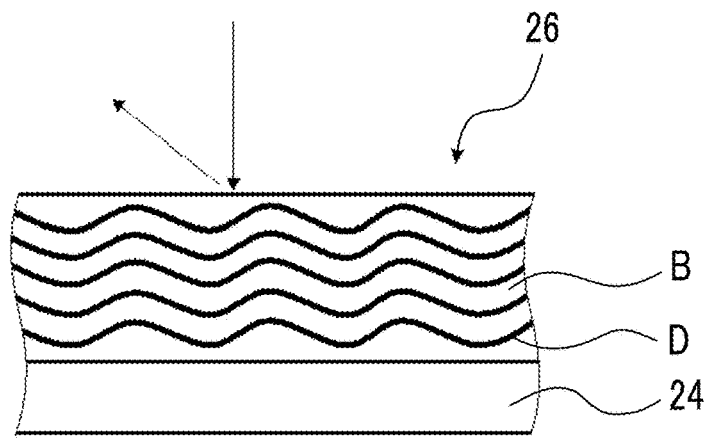
FIG. 4 is a schematic cross sectional view provided for explaining action of reflection of a cholesteric liquid crystal layer.

On the other hand, in a case where the bright portion B and the dark portion D have a wavy structure (uneven structure, wavy structure) like the cholesteric liquid crystal layer 26 whose cross section is conceptually shown in FIG. 4, there is a region where the helical axis of the liquid crystalline compound in the cholesteric liquid crystallline phase is tilted. Therefore, in a case where light is incident from the normal direction of the cholesteric liquid crystal layer 26, a part of the incident light is reflected in an oblique direction (see arrow in FIG. 4).

That is, due to wavy structure formed by the bright portion B and the dark portion D, the cholesteric liquid crystal layer 26 is allowed to exhibit an appropriate amount of diffuse reflectivity.

In the present invention, the wavy structure means a structure in which there is at least one region M in which the absolute value of an inclination angle in a continuous line formed by the bright portion or the dark portion of the striped pattern with respect to a plane of the cholesteric liquid crystal layer 1 is 5° or more, and a peak or valley in which the region M is sandwiched by two points located closest to the region M with an inclination angle of 0° is specified.

A mountain or a valley having an inclination angle of 0° includes a convex shape and a concave shape, but includes a step-like shape and a shelf-like shape as long as the inclination angle is 0°. The wavy structure is preferably a structure in which the region M, in which the absolute value of the inclination angle of the continuous line formed by the bright portion or the dark portion of the striped pattern is 5° or more, and a mountain or valley including the region M occurs repeatedly.

Further, the peak-to-peak distances of the wavy structure is as a distance obtained by measuring distances between the peaks or valleys in which the region M is sandwiched by two points located closest to the region M with an inclination angle of 0° of the cholesteric liquid crystal layer 1 in a planar direction, and arithmetically averaging the distances in the entire film thickness and a length in the longitudinal axis direction of a cross section of the cholesteric liquid crystal layer 100 μm.

Here, in a case where the continuous line is interrupted in contact with any of two interfaces of the film, both ends thereof at the discontinuous portion are regarded as neither mountain nor valley. Also, in a case where the continuous line has a bent structure as shown in FIG. 2, the continuous line is regarded as being interrupted, and both ends thereof are regarded as neither mountain nor valley.

Further, in a case where the angle formed by the fine line segment on the continuous line of the bright portion or the dark portion of the striped pattern and the normal direction of the decorative sheet is defined as the inclination angle and the largest value among standard deviations of inclination angles within 1 μm in one of two surfaces of the decorative sheet is defined as a, and that of the other surface as β, the cholesteric liquid crystal layer 1 used in the present invention preferably satisfies Expressions (5) and (6).

$$\alpha/\beta \geq 1.2 \quad \text{Expression (5)}$$

$$\alpha \geq 2° \quad \text{Expression (6)}$$

It is preferable that α and β are within the above range because the decoration properties change on the front and rear, and thus unique designability can be imparted.

More preferably, the cholesteric liquid crystal layer 1 of the present invention satisfies Expression (5-1), even more preferably Expression (5-2).

Still further preferably, the cholesteric liquid crystal layer 1 satisfies Expression (6-1).

$$\alpha/\beta \geq 1.9 \quad \text{Expression (5-1)}$$

$$\alpha/\beta \geq 2.2 \quad \text{Expression (5-2)}$$

$$\alpha \geq 10° \quad \text{Expression (6-1)}$$

As described above, the cross section of the cholesteric liquid crystal layer 1 used in the present invention preferably has a striped pattern formed of bright and dark portions when observed with SEM.

Here, in the cholesteric liquid crystal layer 1 used in the present invention, at least one of bright (continuous line formed of a bright portion) and dark (continuous line of a dark portion) portion forming the striped pattern is branched, regarding the branches of the bright and dark portions, there is a bright portion or a dark portion having an end portion toward the branched portion between two bright or dark portions among three bright or dark portions extending from the branched portion, and in a case where a structure in which one bright or dark portion between the two bright or dark portions sandwiching the bright or dark portion having an end portion toward the branched portion is included is defined as a structure A, and a structure different only in that three or more bright and dark portions are included is defined as a structure B, it is preferable that the number of the structures A and B included per 100 µm² cross sectional area of the cholesteric liquid crystal layer satisfies any one of Condition I or Condition II.

In Condition I, the structure B is not included, and the number of the structure A included is 0.1 or more and less than 50.

In Condition II, the number of the structure B included is 0.1 or more and less than 10.

Figure 5:
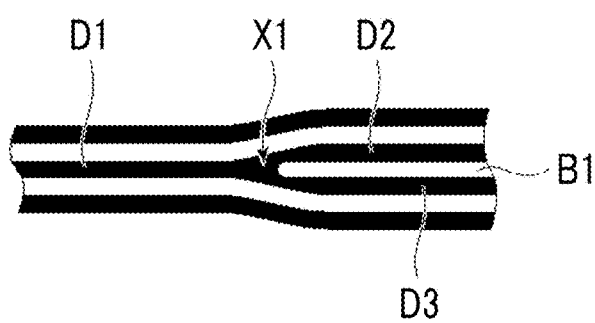
FIG. 5 is a schematic cross sectional view showing an example of an embodiment of the decorative sheet of the present invention.
Figure 5:
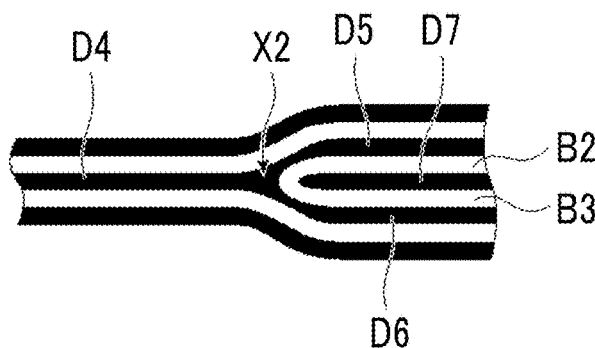
Figure 5:
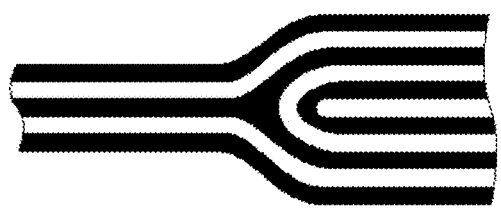

As an example, in the example conceptually shown in the upper part of FIG. 5, the dark portion branches and three of dark portion D1, dark portion D2 and dark portion D3 extend from the branched portion part X1 (continuous lines of dark portion), and between two of the dark portion D2 and the dark portion D3, there is a bright portion B1 having an end portion toward the branched portion X1 (continuous line of bright portion).

That is, the two of the dark portions having a bright portion B1 having an end portion toward the branched portion X1 therebetween are the dark portion D2 and the dark portion D3. In other words, the two of the dark portions, the dark portion D2 and the dark portion D3, sandwich the bright portion B1 having an end portion toward the branched portion X1.

In the example shown in the upper part of FIG. 5, there is only the bright portion B1 between the dark portion D2 and the dark portion D3 (that is, bright portion B1 having an end portion towards the branched portion X1). Therefore, the structure including the branched portion X1 is the structure A.

In the example conceptually shown in the middle part of FIG. 5, the dark portion branches and three of dark portion D4, dark portion D5 and dark portion D6 extend from the branched portion X2, and between two of the dark portion D5 and dark portion D6, there is a dark portion D7 having an end portion toward the branched portion X2. That is, the two of the dark portions sandwiching (having therebetween) the dark portion D7 having an end portion toward the branched portion X2 are the dark portion D5 and the dark portion D6.

In the example shown in the middle part of FIG. 5, there are three bright portions B and dark portion D formed of the dark portion D7, the bright portion B2, and the bright portion B3 between the dark portion D5 and the dark portion D6. Therefore, the structure including the branched portion X2 is the structure B.

In addition, although reference numerals are omitted, in the example shown in the lower part of FIG. 5, the dark portion branches and there is a bright portion having an end portion toward the branched portion between two dark portions among three dark portions extending from the branched portion, and there are a total of five bright and dark portions formed by three bright portions and two dark portions between the two dark portions sandwiching the bright portion. Therefore, the structure including the branched portion is the structure B.

In the present invention, as shown in the middle part and the lower part of FIG. 5, each of the bright and dark portions folded backward such that another bright portion or a dark portion having the end portion toward the branched portion is sandwiched is counted in two.

In addition, as described above, in the cholesteric liquid crystal layer, continuous lines of the bright portion and the dark portion are alternately formed to form a striped pattern. Therefore, the number of bright and dark portions between the two bright or dark portions sandwiching the bright or dark portions having an end portion toward the branched portion is odd.

A specific example will be described using a photograph of a cross section of the cholesteric liquid crystal layer by SEM shown in FIG. 6.

Figure 6:
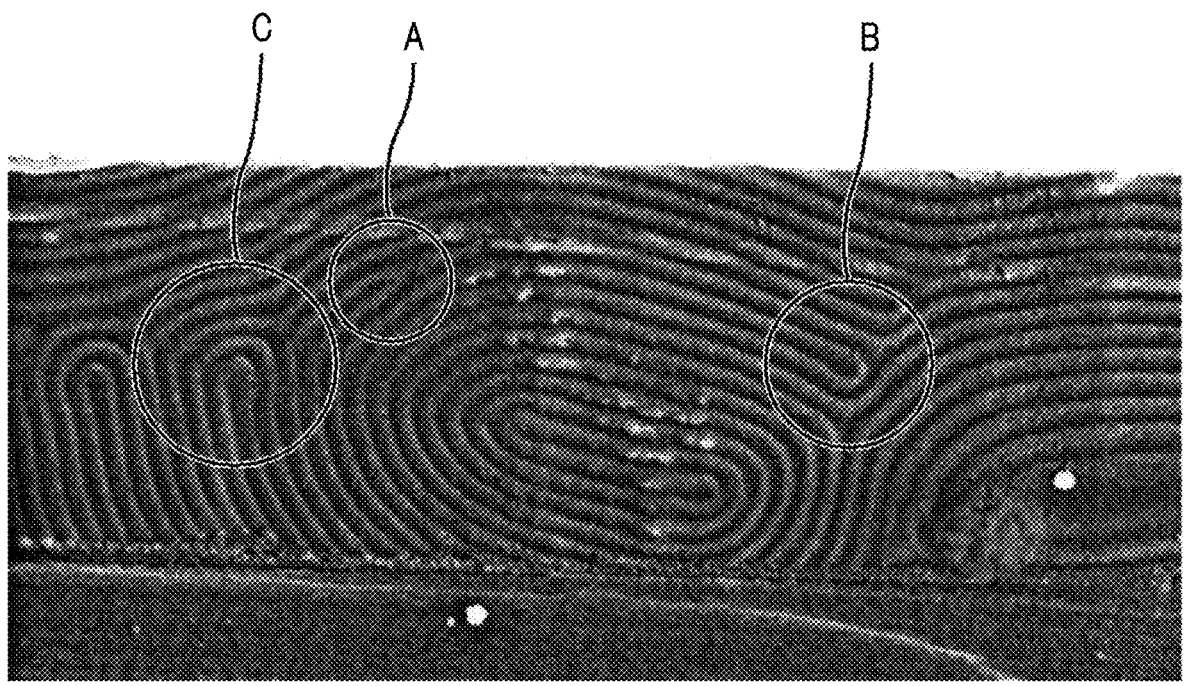
FIG. 6 is a scanning electron microscope of a cross section of an example of a cholesteric liquid crystal layer shown as a reference.

Note that the SEM photograph in FIG. 6 is presented merely as a reference of a cross section of an example of a cholesteric liquid crystal layer to illustrate the structures A and B and does not show the embodiment of the cholesteric liquid crystal layer in the decorative sheet of the present invention.

In FIG. 6, in the portion indicated by a circle A, a bright portion is branched, and between two of three branched bright portions, there is a dark portion having an end portion forward to the branched portion of the branched bright portion. Between the two bright portions sandwiching the dark portion having an end portion toward the branched portion (having dark portion therebetween), there is only one dark portion. Therefore, the structure including the branched portion is the structure A.

In FIG. 6, in the portion indicated by a circle B, a dark portion is branched, and between two of three branched dark portions, there is a dark portion having an end portion forward to the branched portion of the branched dark portion. Between the two dark portions that sandwich the dark portion having an end portion toward the branched portion, there are a total of three bright and dark portions formed by one dark portion and two bright portions. Therefore, the structure including the branched portion is the structure B.

Further, in FIG. 6, in the portion indicated by a circle C, a dark portion is branched, and between two of three branched dark portions, there is a dark portion having an end portion forward to the branched portion of the branched dark portion. Between the two dark portions that sandwich the dark portion having an end portion toward the branched portion of the dark portion, there are a total of seven bright and dark portions formed by three dark portion and four bright portions. Therefore, the structure including the branched portion is the structure B.

The cholesteric liquid crystal layer 1 used in the decorative sheet of the present invention is preferably a cholesteric liquid crystal layer in which the number of the structures A and B included per 100 µm² of cross sectional area observed by the SEM satisfies any one of the condition I "the structure B is not included, and the number of the structure A included is 0.1 or more and less than 50" and the condition II "the number of the structure B included is 0.1 or more and less than 10".

In Condition II, the structure A may or may not be included per 100 µm² cross sectional area of the cholesteric liquid crystal layer 1. Here, in Condition II, in a case where the structure A is included per 100 µm² cross sectional area of the cholesteric liquid crystal layer, the number of the structure A included per 100 µm² cross sectional area of the cholesteric liquid crystal layer 1 is preferably 40 or less, more preferably 20 or less.

The branched portion of the bright portion B and the dark portion D in the cholesteric liquid crystal layer 1 is a portion where the alignment of the liquid crystalline compound forming the cholesteric liquid crystal layer 1 is disturbed. In the portion where the liquid crystalline compound is aligned disorderly, the cholesteric liquid crystal layer 1 shows diffuse reflectivity. Therefore, in the cholesteric liquid crystal layer 1, the greater the number of branched portions of the bright portion B and the dark portion D, the higher the diffuse reflectivity becomes. Further, compared to the structure A, the structure B is strongly disordered in terms of the alignment of the liquid crystalline compound, and the diffuse reflectivity is stronger in the structure B than in the structure A.

Therefore, in the present invention, when the cholesteric liquid crystal layer 1 satisfies any one of the conditions I and II, which defines the number of the structures A and B per unit area, the cholesteric liquid crystal layer 1 exhibits an appropriate amount of diffuse reflectivity, and thus the lustrousness can further be improved.

In the present invention, the number of the structures A and B included per 100 $\mu m^2$ cross sectional area of the cholesteric liquid crystal layer 1 is obtained by arbitrarily selecting 10 regions not overlapping each other in an area of 100 $\mu m^2$ in the cross section of the cholesteric liquid crystal layer 1 observed by SEM, counting the number of structure A and structure B in each region, and averaging the number of structure A and Structure B in the 10 regions.

{Surface Roughness}

The surface roughness of the cholesteric liquid crystal layer 1 used in the present invention is preferably 100 nm or less.

It is preferable to set the surface roughness of the cholesteric liquid crystal layer to 100 nm or less from the viewpoint no whiteness on the surface, excellent designability and the like.

<Method of Measuring Surface Roughness>

In the present invention, the surface roughness is a surface roughness (arithmetic average roughness Ra) measured using a noncontact three-dimensional surface shape measuring instrument (VertScan, manufactured by Ryoka Systems Co., Ltd.).

[Method of Producing Cholesteric Liquid Crystal Layer]

The cholesteric liquid crystal layer 1 used in the present invention may be obtained, for example, by forming the undercoat layer 2 made of a hydrophilic resin such as polyvinyl alcohol on the support 3, applying a liquid crystalline composition on the undercoat layer 2, and fixing the compound in a cholesteric alignment state. In a case where the support 3 is subjected to corona treatment or the like to make the surface of the support 3 hydrophilic, the undercoat layer is not necessarily required.

It is preferable that alignment restriction force is not applied or a weak alignment restriction force is applied to the support 3 and the undercoat layer 2. For example, it is preferable that the rubbing treatment is not performed or the weak rubbing treatment is performed. By applying an appropriate alignment restriction force, it is possible to obtain the preferable wavy structure described above.

Further, the support 3 or the undercoat layer 2 is preferably smooth, but in order to obtain the above-described wavy structure, an uneven structure may be formed in the support 3 and/or the undercoat layer 2 in advance, the uneven structure may be regular or irregular (random).

Further, in order to prepare a decorative sheet satisfying the above Expression (3), the helical axis of the cholesteric alignment in the cholesteric liquid crystal layer 1 may be tilted. The average value of the absolute value of the inclination angle of the helical axis is preferably 4° to 15°. The cholesteric liquid crystal layer 1 in which the helical axis is tilted may be prepared by using, for example, spin coating.

Further, after the liquid crystalline composition is applied and dried, the temperature is adjusted to obtain a cholesteric alignment state, and the temperature lowering rate at that time is preferably 0.4° C. to 60° C. per second, more preferably 2° C. to 12° C. per second. By meeting the above conditions, the lustrousness can be further enhanced.

[Surfactant]

The cholesteric liquid crystal layer 1 used in the present invention may have a surfactant. By using the surfactant, it is possible to effectively form a cholesteric liquid crystal layer satisfying the above Expressions (5) and (6).

It is more preferable to use a surfactant having the property of aligning the liquid crystalline compound in the vicinity of the air interface of the cholesteric liquid crystal layer 1 in parallel with the surface of the cholesteric liquid crystal layer in order to obtain the above preferable wavy structure. The surfactant may be either a fluorine-based surfactant or a silicone-based surfactant, but a fluorine-based surfactant is preferable.

The surfactant is preferably one having a mesogen moiety in the molecule so that the liquid crystalline compound in the vicinity of the air interface of the cholesteric liquid crystal layer 1 is aligned parallel to the surface of the cholesteric liquid crystal layer 1, and it is preferable to have a group having a surface active function at one terminal of the surfactant molecule, more preferably at both terminals.

The cholesteric liquid crystal layer 1 used in the present invention preferably contains a large amount of surfactant on the surface on the air interface side. The uneven surface distribution of the surface activity can be confirmed by measuring the abundance ratio of fluorine atoms on both surfaces of the cholesteric liquid crystal layer 1, for example.

[Chiral Agent]

The cholesteric liquid crystal layer 1 used in the present invention may have a chiral agent. As the chiral agent, various known ones can be used.

EXAMPLES

Hereinafter, the present invention will be specifically described based on Examples. Materials, reagents, substance amounts and their proportions, operations, and the like shown in the following examples may be appropriately changed as long as they do not depart from the gist of the present invention. Therefore, the present invention is not limited to the following examples.

Example 1

<Preparation of Transparent Support 1>

The following composition was charged into a mixing tank and stirred while heating to dissolve each component to prepare a cellulose acetate solution.

| (Composition of Cellulose Acetate Solution) | |
|---|---|
| Cellulose acetate having an acetylation degree of 60.7 to 61.1% | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 336 parts by mass |
| Methanol (second solvent) | 29 parts by mass |
| 1-Butanol (third solvent) | 11 part by mass |

16 parts by mass of the following retardation increasing agent (A), 92 parts by mass of methylene chloride and 8 parts by mass of methanol were charged into another mixing tank, and stirred while heating to prepare a retardation increasing agent solution. 474 parts by mass of the cellulose acetate solution and 25 parts by mass of the retardation increasing agent solution were mixed and thoroughly stirred to prepare a dope. The addition amount of the retardation increasing agent was 6.0 parts by mass with respect to 100 parts by mass of cellulose acetate.

Retardation Increasing Agent A

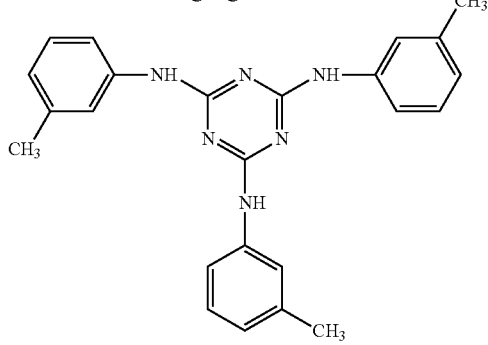

The obtained dope was cast using a band drawing machine. After the film surface temperature on the band reached 40° C., the film was dried for 1 minute with warm air at 70° C., and the film was dried from the band with a drying air at 140° C. for 10 minutes to obtain a residual solvent amount of 0.3% of triacetyl cellulose film was prepared.

This film is defined as a transparent support 01.

<Preparation of Undercoat Layer>

On the surface of the transparent support 01, an undercoat layer coating solution having the following composition was applied by a #16 wire bar coater. Thereafter, it was dried at 60° C. for 60 seconds and further at 90° C. for 150 seconds. An undercoat layer-attached transparent support 01 was prepared.

| (Undercoat Layer Coating Solution) | |
|---|---|
| Modified polyvinyl alcohol (PVA) shown below | 10 parts by mass |
| Water | 370 parts by mass |
| Methanol | 120 parts by mass |
| Glutaraldehyde (crosslinking agent) | 0.5 parts by mass |

Modified polyvinyl alcohol

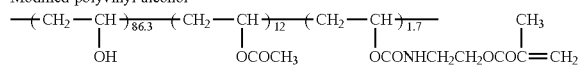

<Preparation of Coating Solution for Cholesteric Liquid Crystal Layer Gm1>

The composition shown below was stirred and dissolved in a container kept at 25° C. to prepare a coating solution Gm1 for a cholesteric liquid crystal layer.

| (Coating Solution for Cholesteric Liquid Crystal Layer Gm1) | |
|---|---|
| Methyl ethyl ketone | 145.0 parts by mass |
| Mixture of rod-like liquid crystalline compounds shown below | 100.0 parts by mass |
| IRGACURE 907 (manufactured by Ciba-Geigy) | 3.0 parts by mass |
| KAYACURE DETX (manufactured by Nippon Kayaku Co., Ltd.) | 1.0 part by mass |
| Chiral agent A having the following structure | 5.78 parts by mass |
| Surfactant F1 having the following structure | 0.08 parts by mass |

Rod-like liquid crystalline compound

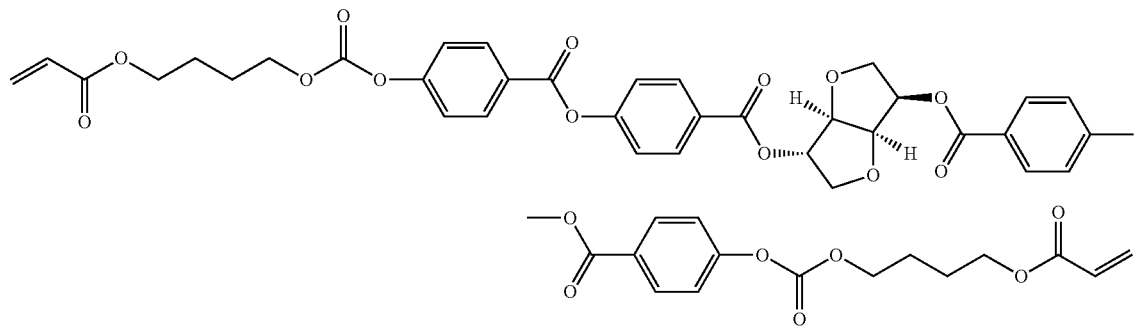

The unit of the numerical values is mass %. R is a group bonded through an oxygen atom.

Chiral Agent A

Surfactant F1

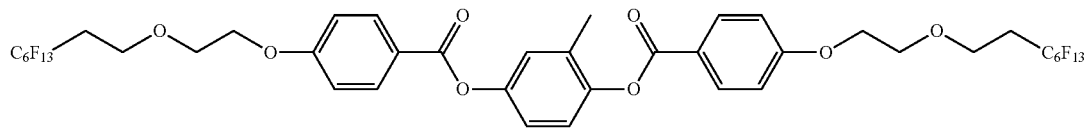

The coating solution for a cholesteric liquid crystal layer Gm1 is a material for forming a cholesteric liquid crystal layer which reflects light having a central wavelength of 550 nm. The coating solution for a cholesteric liquid crystal layer Gm1 is a material for forming a reflection layer that reflects right circular polarized light. That is, the coating solution for a cholesteric liquid crystal layer Gm1 is a material for reflecting right polarized green light.

The coating solution for a cholesteric liquid crystal layer Gm1 prepared above was coated on the surface of the undercoat layer-attached transparent support 01 with a spin coater at a rotation speed of 1500 rpm for a rotation time of 10 seconds, dried at 95° C. for 60 seconds, the temperature was lowered at −7° C./s until reaching 25° C., and the coated solution was irradiated with ultraviolet rays at 25° C. with an ultraviolet irradiation apparatus at 500 mJ/cm² of ultraviolet rays, thereby producing a decorative sheet 01.

Examples 2 to 6

Decorative sheets 02 to 06 of Examples 2 to 6 were prepared in the same manner as in Example 1 except that the amount of the surfactant F1 of the coating solution for a cholesteric liquid crystal reflection layer Gm1 was changed as shown in Table 1.

Examples 7 to 10

Decorative sheets 07 to 10 of Examples 7 to 10 were prepared in the same manner as in Example 1 except that the prepared undercoat layer-attached transparent support 01 was rubbed with a rubbing roll in a direction parallel to the transfer direction with a clearance of 2.0 mm and 1000 rev/min, and this was repeated the number of times shown in Table 1.

The setting of the rubbing clearance of 2.0 mm was a weak condition as a condition for applying the alignment restriction force, and was performed in order to gently control the alignment state of the liquid crystal in the vicinity of the undercoat layer.

Examples 11 to 22

Decorative sheets 11 to 22 of Examples 11 to 22 were prepared in the same manner as in Example 1 except that the coating solution for a cholesteric liquid crystal reflection layer Gm1 prepared above was applied on the surface of the undercoat layer-attached transparent support 01 with a spin coater at a rotation speed of 1500 rpm for a rotation time of 10 seconds, dried at 95° C. for 60 seconds, and the temperature was lowered at conditions shown in Table 1 until reaching 25° C. and the coated solution was irradiated with ultraviolet rays at 25° C. with an ultraviolet irradiation apparatus at 500 mJ/cm² of ultraviolet rays.

Examples 23 to 26

Decorative sheets 23 to 26 of Examples 23 to 26 were prepared in the same manner as in Example 1 except that the coating solution for a cholesteric liquid crystal reflection layer Gm1 prepared above was applied on the surface of the undercoat layer-attached transparent support 01 with a spin coater at rotation speeds shown in Table 1 for a rotation time of 10 seconds, dried at 95° C. for 60 seconds, and the temperature was lowered at −7° C./s until reaching 25° C. and the coated solution was irradiated with ultraviolet rays at 25° C. with an ultraviolet irradiation apparatus at 500 mJ/cm² of ultraviolet rays.

Example 27

Using the undercoat layer-attached transparent support 01 of Example 1, decorative sheet 26 was prepared as follows.
<Preparation of Undercoat Layer 02>

On the surface of the undercoat layer-attached transparent support 01, an undercoat layer coating solution 02 having the following composition was applied by a #3.6 wire bar coater. Thereafter, the coating solution was dried at 95° C. for 60 seconds, irradiated with ultraviolet rays at 25° C. at 500 mJ/cm² with an ultraviolet irradiation apparatus to prepare an undercoat layer-attached transparent support 02.

| (Undercoat Layer Coating Solution 02) | |
|---|---|
| KAYARAD PET30 (manufactured by Nippon Kayaku Co., Ltd.) | 100 parts by mass |
| IRGACURE 907 (manufactured by Ciba-Geigy) | 3.0 parts by mass |
| KAYACURE DETX (manufactured by Nippon Kayaku Co., Ltd.) | 1.0 part by mass |
| Methyl ethyl ketone | 120 parts by mass |

Note that KAYARAD PET30 is a mixture of pentaerythritol triacrylate and pentaerythritol tetraacrylate (PETA).

On the surface of the undercoat layer-attached transparent support 02, the coating solution for a cholesteric liquid crystal layer Gm1 prepared in the same manner as in Example 1 was coated with a #8.0 wire bar coater. Thereafter, the coating solution was dried at 95° C. for 60 seconds, the temperature was lowered at −7° C./s until reaching 25° C., and the coated solution was irradiated with ultraviolet rays at 25° C. at 500 mJ/cm² with an ultraviolet irradiation apparatus to prepare a decorative sheet 27 of Example 27.

Comparative Example 1

A decorative sheet 101 of Comparative Example 1 was prepared by rubbing the undercoat layer-attached transparent support 01 prepared in Example 1 with a rubbing roll in a direction parallel to the transfer direction with a clearance of 1.6 mm and 1000 rev/min, applying the coating solution for a cholesteric liquid crystal reflection layer Gm1 with a spin coater at a rotation speed of 1500 rpm for a rotation time of 10 seconds, drying the coating solution at 95° C. for 60 seconds, and irradiating the coated solution with ultraviolet rays with an ultraviolet irradiation apparatus at 500 mJ/cm² of ultraviolet rays.

The setting of the rubbing clearance of 1.6 mm was a strong condition as a condition for applying the alignment restriction force, and was performed in order to strictly control the alignment state of the liquid crystal in the vicinity of the undercoat layer.

Comparative Example 2

A decorative sheet 102 of Comparative Example 2 was prepared in the same manner as in Example 1 except that the surfactant F 1 was not added into the coating solution for a cholesteric liquid crystal reflection layer Gm1.

Comparative Example 3

A decorative sheet 103 of Comparative Example 3 was prepared in the same manner as in Example 1 except that the surfactant F1 was not added the coating solution for a cholesteric liquid crystal reflection layer Gm1 but instead 0.4 parts by mass of the surfactant F2 having the following structure was added thereto.
Surfactant F2

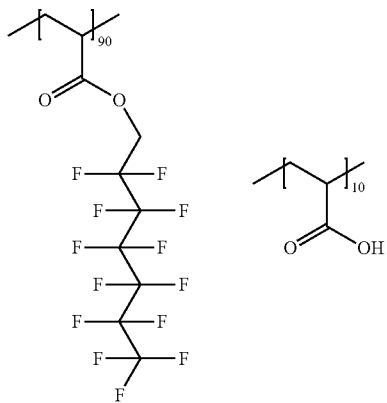

A decorative sheet 104 of Comparative Example 4 was prepared in the same manner as in [0092] to [0102] in the examples of JP4170834B.

Note that AC-X used for the undercoat layer is a polyester-based easy adhesive.

<Evaluation>

The results of measuring and evaluating the decorative sheets prepared in Examples and Comparative Examples are shown in Table 1 below.

<Number of Structure A and Structure B>

In the cross sectional SEM photograph of the formed cholesteric liquid crystal layer, 10 regions having an area of 100 μm² are arbitrarily selected, the numbers of structures A and B in the regions are counted, and the average number with respect to the 10 regions is taken as the number of the structures A and B per 100 μm² cross sectional area of the cholesteric liquid crystal layer of each decorated sheet.

<Measurement of Characteristic Reflectance>

The peak wavelength of the characteristic reflectance was determined according to the method of measuring the characteristic reflectance described above. In each of the decorative sheets of Examples and Comparative Examples, the peak wavelength of the characteristic reflectance was around 550 nm.

<Measurement of Reflectance>

$R[-45,20](\lambda 1), R[-45,20](\lambda 2), R[-45,15](\lambda 1)$ were measured according to the reflectance measurement method described above.

<Measurement of Average Value of Peak-to-Peak Distances of Wavy Structure>

In the cross sectional SEM photograph of the formed cholesteric liquid crystal layer, measurements were made according to the method of measuring the average value of the peak-to-peak distances of wavy structure described above.

<Measurement of α and β>

In the cross sectional SEM photograph of the formed cholesteric liquid crystal layer, all the striped pattern located within 1 μm in the film thickness direction from both surfaces of the cholesteric liquid crystal layer are coordinated, and the inclination (inclination angle) of each point was calculated every 0.12 μm in the direction parallel to the film over 55 μm.

The inclination (inclination angle) of each point is inclination (inclination angle) calculated from coordinate data of ±0.3 μm (0.6 μm) around each point. Standard deviations were calculated from statistical processing of numerical values of these inclinations (inclination angles), to measure α and β.

<Measurement of Maximum Value and Minimum Value of Reflectance>

With respect to each of the decorative sheets in a range of 5 cm×5 cm, at intervals of 500 μm, $R_{max}[0,15](\lambda 1)$ and $R_{min}[0,15](\lambda 1)$ in the reflectance of incident light with a polar angle of −45° to the decorative sheet measured at a wavelength 2, and a light-receiving angle expressed by a polar angle of 15° at an azimuthal angle in a range of 0° to 360° were obtained, and the maximum value of $R_{max}[0,15](\lambda 1)/R_{min}[0,15](\lambda 1)$ was listed in Table 1 as the maximum value/the minimum value of the reflectance.

<Measurement of Integral Reflectance>

Measurement was carried out according to the method of measuring the integral reflectance described above.

<Method of Measuring Haze>

The internal haze value (Hi)/total haze value (Ht) was determined according to the haze measuring method described above.

<Method of Measuring Surface Roughness>

Measurement was carried out according to the method of measuring the surface roughness described above.

<Evaluation of Lustrousness>

The decorative sheets of Examples and Comparative Example each were visually evaluated by 20 evaluators under the following criteria, the points were averaged, the decimal places of the average points were rounded off, whereby lustrousness of the decorative sheets were evaluated. The evaluation was carried out from the viewpoint of lustrousness when observed from a direction deviated from the specular reflection of the illumination light in the bright room.

1: Not lustrous at all
2: Barely lustrous
3: Slightly lustrous
4: Fairly lustrous
5: Highly lustrous
6: Extremely lustrous
7: Extremely lustrous even more than standard 6

TABLE 1

| | Formulation • Process condition | | | | | | Results | | |
|---|---|---|---|---|---|---|---|---|---|
| | Undercoat layer material | Surfactant Type | Surfactant Addition amount [parts by mass] | Clearance and rubbing time | Cooling rate after drying [° C./sec] | Spin coal rotation speed [rpm] | Number of structure A [pieces/ 100 μm²] | Number of structure B [pieces/ 100 μm²] | R[−45, 20] (λ1)/R[−45, 20] (λ2) |
| Comparative Example 1 | PVA | F1 | 0.08 | 1.6 mm × 1 | 7 | 1500 | 0.0 | 0.0 | 2.3 |
| Comparative Example 2 | PVA | — | — | — | 7 | 1500 | 0.0 | 15.0 | 2.8 |
| Comparative Example 3 | PVA | F2 | 0.4 | — | 7 | 1500 | 0.0 | 15.0 | 2.8 |
| Comparative Example 4 | AC-X | — | — | — | 7 | — | 0.0 | 16.5 | 3.2 |
| Example 1 | PVA | F1 | 0.08 | — | 7 | 1500 | 0.9 | 6.0 | 40.0 |
| Example 2 | PVA | F1 | 0.015 | — | 7 | 1500 | 0.0 | 9.9 | 5.0 |
| Example 3 | PVA | F1 | 0.02 | — | 7 | 1500 | 0.0 | 9.0 | 9.0 |
| Example 4 | PVA | F1 | 0.03 | — | 7 | 1500 | 0.0 | 7.5 | 10.0 |
| Example 5 | PVA | F1 | 0.05 | — | 7 | 1500 | 0.0 | 7.5 | 19.0 |
| Example 6 | PVA | F1 | 0.06 | — | 7 | 1500 | 0.9 | 6.0 | 20.0 |
| Example 7 | PVA | F1 | 0.08 | 2.0 mm × 4 | 7 | 1500 | 0.1 | 0.0 | 40.0 |
| Example 8 | PVA | F1 | 0.08 | 2.0 mm × 3 | 7 | 1500 | 0.5 | 3.0 | 41.0 |
| Example 9 | PVA | F1 | 0.08 | 2.0 mm × 2 | 7 | 1500 | 0.5 | 3.0 | 40.0 |
| Example 10 | PVA | F1 | 0.08 | 2.0 mm × 1 | 7 | 1500 | 0.9 | 6.0 | 40.0 |
| Example 11 | PVA | F1 | 0.08 | — | 60 | 1500 | 50.0 | 0.0 | 40.0 |
| Example 12 | PVA | F1 | 0.08 | — | 30 | 1500 | 45.0 | 0.0 | 40.0 |
| Example 13 | PVA | F1 | 0.08 | — | 15 | 1500 | 45.0 | 0.0 | 40.0 |
| Example 14 | PVA | F1 | 0.08 | — | 12 | 1500 | 10.0 | 3.0 | 40.0 |
| Example 15 | PVA | F1 | 0.08 | — | 10.5 | 1500 | 10.0 | 3.0 | 42.0 |
| Example 16 | PVA | F1 | 0.08 | — | 10 | 1500 | 0.9 | 6.0 | 40.0 |
| Example 17 | PVA | F1 | 0.08 | — | 5 | 1500 | 0.9 | 6.0 | 40.0 |
| Example 18 | PVA | F1 | 0.08 | — | 4 | 1500 | 0.5 | 3.0 | 40.0 |
| Example 19 | PVA | F1 | 0.08 | — | 2 | 1500 | 0.5 | 3.0 | 40.0 |
| Example 20 | PVA | F1 | 0.08 | — | 1.8 | 1500 | 0.5 | 3.0 | 41.0 |
| Example 21 | PVA | F1 | 0.08 | — | 0.45 | 1500 | 0.1 | 1.0 | 40.0 |
| Example 22 | PVA | F1 | 0.08 | — | 0.4 | 1500 | 0.08 | 1.0 | 40.0 |
| Example 23 | PVA | F1 | 0.08 | — | 7 | 500 | 35.0 | 0.5 | 40.0 |
| Example 24 | PVA | F1 | 0.08 | — | 7 | 750 | 30.0 | 1.0 | 40.0 |
| Example 25 | PVA | F1 | 0.08 | — | 7 | 1150 | 30.0 | 1.0 | 40.0 |
| Example 26 | PVA | F1 | 0.08 | — | 7 | 1200 | 10.0 | 3.0 | 40.0 |
| Example 27 | PETA | F1 | 0.08 | — | 7 | — | 0.6 | 1.2 | 56.0 |

| | Results | | | | | | | |
|---|---|---|---|---|---|---|---|---|
| | R[−45, 20] (λ1)/R[−45, 15] (λ1) | Peak-to-peak distance in wavy structure | α [°] | Maximum value/ minimum value of reflectance | Integral reflectance [%] | Hi/Ht [%] | Surface roughness Ra [nm] | Evaluation Lustrousness |
| Comparative Example 1 | 1.0 | no peak | 1 | 1.2 | 1 | 1 | 30 | 5 | 1 |
| Comparative Example 2 | 1.2 | 6.8 | 11 | 1.1 | 5 | 40 | 50 | 28 | 2 |
| Comparative Example 3 | 1.2 | 6.9 | 11 | 1.1 | 5 | 40 | 50 | 31 | 2 |
| Comparative Example 4 | 1.2 | 6.9 | 11 | 1.3 | 5 | 40 | 50 | 31 | 2 |
| Example 1 | 1.2 | 7 | 11 | 2.5 | 5 | 42 | 83 | 30 | 6 |
| Example 2 | 1.2 | 6.9 | 11 | 1.8 | 5 | 29 | 50 | 31 | 3 |
| Example 3 | 1.2 | 6.9 | 11 | 1.8 | 5 | 29 | 50 | 31 | 3 |
| Example 4 | 1.2 | 7 | 11 | 1.9 | 5.1 | 30 | 55 | 28 | 5 |
| Example 5 | 1.2 | 6.9 | 11 | 2.1 | 5 | 39 | 70 | 30 | 5 |
| Example 6 | 1.2 | 7 | 11 | 2.2 | 5.1 | 40 | 75 | 30 | 6 |
| Example 7 | 1.8 | 6.8 | 1.8 | 2.5 | 5 | 40 | 83 | 31 | 4 |
| Example 8 | 1.7 | 7.2 | 2 | 2.5 | 5.1 | 40 | 83 | 28 | 5 |
| Example 9 | 1.5 | 7.2 | 9 | 2.5 | 5 | 40 | 83 | 29 | 5 |
| Example 10 | 1.4 | 6.9 | 10 | 2.5 | 5 | 40 | 83 | 30 | 6 |
| Example 11 | 1.2 | 0.4 | 11 | 2.5 | 5.1 | 42 | 83 | 29 | 3 |
| Example 12 | 1.2 | 0.5 | 11 | 2.5 | 5 | 42 | 83 | 30 | 4 |
| Example 13 | 1.2 | 1.4 | 11 | 2.5 | 5 | 42 | 83 | 28 | 4 |
| Example 14 | 1.2 | 1.5 | 11 | 2.5 | 5 | 42 | 83 | 31 | 5 |
| Example 15 | 1.2 | 2.4 | 11 | 2.5 | 5.1 | 42 | 83 | 29 | 5 |
| Example 16 | 1.2 | 2.5 | 11 | 2.5 | 5 | 42 | 83 | 30 | 6 |
| Example 17 | 1.2 | 10 | 11 | 2.5 | 5 | 42 | 83 | 29 | 6 |
| Example 18 | 1.2 | 11 | 11 | 2.5 | 5.2 | 42 | 83 | 28 | 5 |
| Example 19 | 1.2 | 20 | 11 | 2.5 | 5.2 | 42 | 83 | 31 | 5 |
| Example 20 | 1.2 | 22 | 11 | 2.5 | 5 | 42 | 83 | 30 | 4 |
| Example 21 | 1.2 | 50 | 11 | 2.5 | 5.2 | 42 | 83 | 28 | 4 |

TABLE 1-continued

| Example 22 | 1.2 | 55  | 11  | 2.5 | 5   | 42   | 83 | 31  | 3 |
| Example 23 | 1.2 | 6.9 | 11  | 2.5 | 1.2 | 42   | 83 | 105 | 3 |
| Example 24 | 1.2 | 7   | 11  | 2.5 | 1.3 | 42   | 83 | 100 | 4 |
| Example 25 | 1.2 | 7.2 | 11  | 2.5 | 2.8 | 42   | 83 | 35  | 4 |
| Example 26 | 1.2 | 7   | 11  | 2.5 | 3   | 42   | 83 | 30  | 5 |
| Example 27 | 2.4 | 9.5 | 3.9 | 1.6 | 1.2 | 36.1 | 86 | 16  | 7 |

Example 28

A decorative sheet 28 was prepared in the same manner as in Example 1 except that the rotation time taken to apply the coating solution for a cholesteric liquid crystal layer Gm1 prepared above on the surface of the undercoat layer-attached transparent support 01 with a spin coater was set to 2 seconds.

$R[-45,20](\lambda 1)$ and $R[-45,20](\lambda 2)$ were measured for the prepared decorative sheet 28 in accordance with the reflectance measuring method described above and in the same manner as above, $R[-45,20](\lambda 1)/R[-45,20](\lambda 2)$ at the center of the decorative sheet and $R[-45,20](\lambda 1)/R[-45,20](\lambda 2)$ at the surroundings of the same were calculated.

As a result, it has been found that at the center of the decorative sheet, $R[-45,20](\lambda 1)/R[-45,20](\lambda 2)=40.0$, and at the surroundings $R[-45,20](\lambda 1)/R[-45,20](\lambda 2)=40.0$.

With respect to the prepared decorative sheet 28 in a range of 5 cm×5 cm, at intervals of 500 μm, $R_{max}[0,15](\lambda 1)$ and $R_{min}[0,15](\lambda 1)$ in the reflectance of incident light with a polar angle of −45° to the decorative sheet at a wavelength λ and a light-receiving angle expressed by a polar angle of 15° at an azimuthal angle in a range of 0° to 360° were measured, and in the same manner as the above, the maximum value/the minimum value of the reflectance at the center of the decorative sheet, and the maximum value/the minimum value of the reflectance at the surroundings were calculated.

As a result, it has been found that at the center of the decorative sheet, the maximum value/the minimum value of the reflectance was 1.08, and at the surroundings, the maximum value/the minimum value was 1.3. In addition, the decorative sheet 28 had sharpness in its lustrousness on the surface, and it was confirmed that the texture having high designability for a decorative use is realized.

Example 29

(Preparation of Coating Solution for Cholesteric Liquid Crystal Reflection Layer Gm2)

After preparing the following composition, the composition was filtered with a polypropylene filter having a pore diameter of 0.2 μm and used as a coating solution for a cholesteric liquid crystal reflection layer Gm2.

LC-1-1 was synthesized according to the method described in JP2004-012382A. LC-1-1 is a liquid crystalline compound having two reactive groups, one of the two reactive groups is an acrylic group which is a radical reactive group, the other is an oxetane group which is a cationic reactive group. LC-1-2 was synthesized according to the method described in Tetrahedron Lett., Vol. 43, p. 6793 (202).

| Coating Solution for Cholesteric Liquid Crystal Reflection Layer Gm2 (parts by mass) | |
|---|---|
| Rod-like liquid crystal (LC-1-1) | 19.57 |
| Horizontal alignment agent (LC-1-2) | 0.01 |
| Cationic monomer | 0.98 |
| (OXT-121, manufactured by Toagosei Co., Ltd.) | |
| Cationic initiator | 0.4 |
| (Curacure UVI 6974, manufactured by Dow Chemical) | |
| Polymerization control agent | 0.02 |
| (IRGANOX 1076, manufactured by BASF) | |
| Chiral agent A shown above | 1.13 |
| Methyl ethyl ketone | 80.0 |

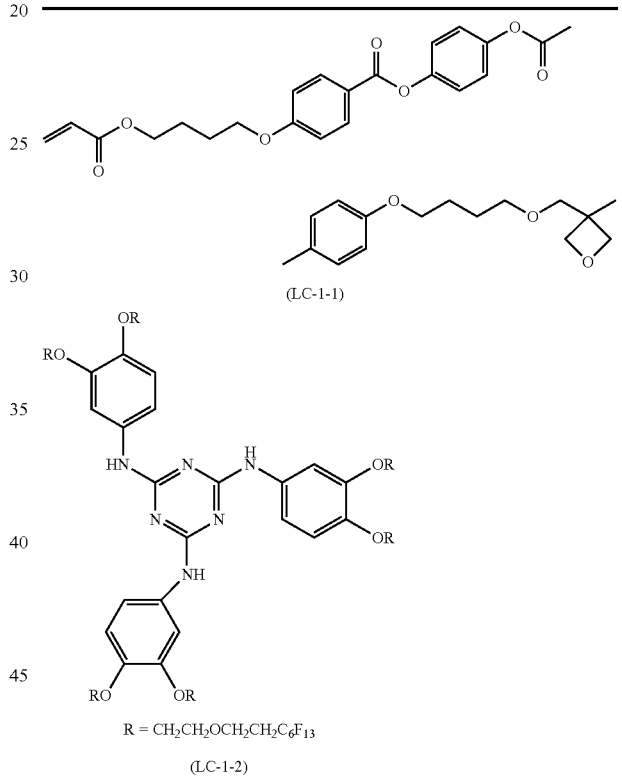

(LC-1-1)

(LC-1-2)

$R = CH_2CH_2OCH_2CH_2C_6F_{13}$ (Preparation of Coating Solution for Protective Layer AD-1)

After preparing the following composition, the composition was filtered with a polypropylene filter having a pore diameter of 0.2 μm and used as a coating solution for a protective layer AD-1.

| Coating Solution for Protective Layer AD-1 (parts by mass) | |
|---|---|
| Benzyl methacrylate/methacrylic acid/methyl methacrylate = 35.9/22.4/41.7 molar ratio of random copolymer (weight average molecular weight 38,000) | 8.05 |
| Radical photopolymerization initiator 2-Trichloromethyl-5-(p-styrylstyryl)-1,3,4-oxadiazole | 0.12 |
| Hydroquinone monomethyl ether | 0.002 |
| Megafac F-176 PF (manufactured by Dainippon Ink and Chemicals, Incorporated) | 0.05 |

| Coating Solution for Protective Layer AD-1 (parts by mass) | |
| --- | --- |
| Propylene glycol monomethyl ether acetate | 34.80 |
| Methyl ethyl ketone | 50.538 |
| Methanol | 1.61 |

(Formation of Patterned Cholesteric Liquid Crystal Reflection Layer)

The coating solution for a cholesteric liquid crystal reflection layer Gm2 prepared in the above was applied on the surface of the prepared undercoat layer-attached transparent support 01 with a spin coater at a rotation speed of 1500 rpm for a rotation time of 10 seconds and heated and matured at 95° C. for 60 seconds, and immediately thereafter, ultraviolet rays of 500 mJ/cm$^2$ were irradiated using an air-cooled metal halide lamp (manufactured by Eye Graphics Co., Ltd.) under air in which the film surface temperature is 70° C. so as to fix the alignment state, whereby a pattern builder was formed.

Figure 7:
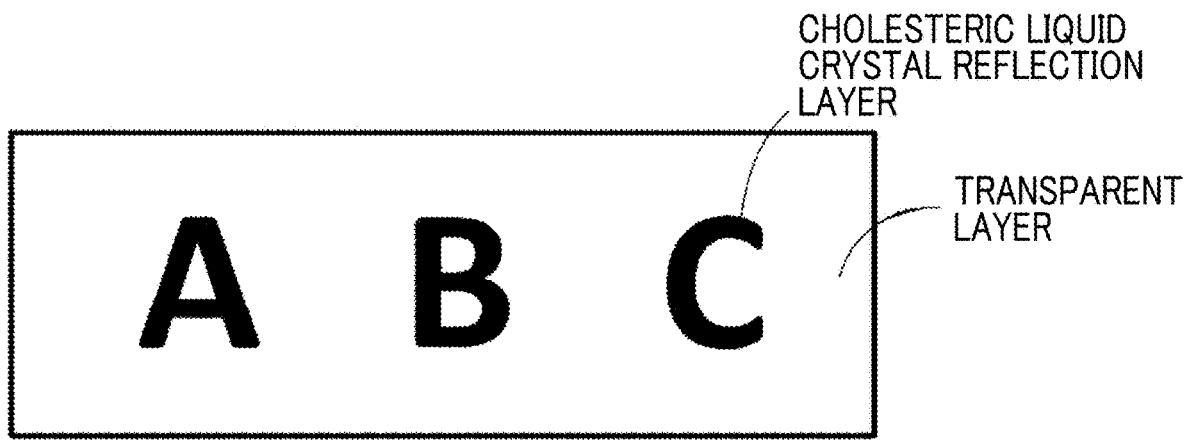
FIG. 7 is a mask pattern used in Example 29 and Example 30.
Figure 8:
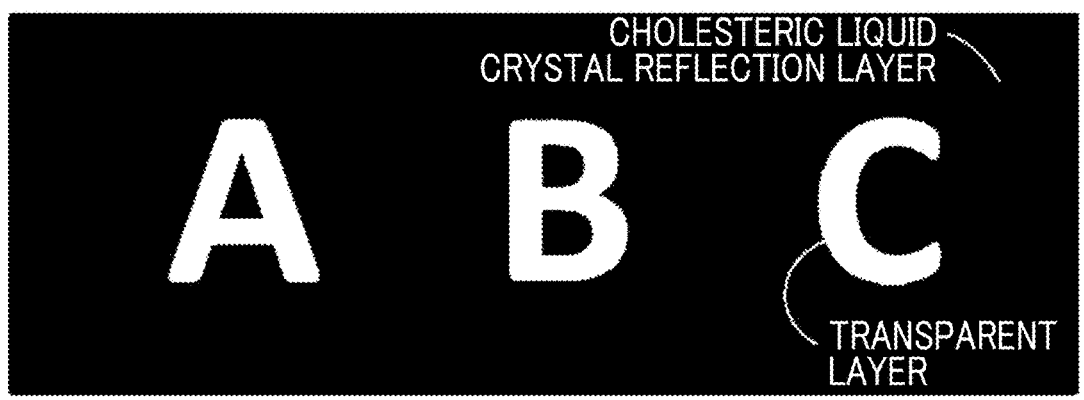
FIG. 8 is a mask pattern used in Example 29 and Example 30.

The coating solution for a protective layer AD-1 prepared as such was applied to the pattern builder thus obtained, dried at 80° C. for 60 seconds, and then exposed to light under air at 25° C. using an exposure PLA-501F (ultra-high pressure mercury lamp, manufactured by Canon Inc.) in an exposure amount of 50 mJ/cm$^2$ through a mask of the pattern shown in FIG. 7 or FIG. 8. Thereafter, the entire substrate was baked in an oven at 200° C. for 30 minutes, so that a decorated sheet 29 of Example 29 having a region with high lustrousness due to the presence of the cholesteric liquid crystal alignment and a region optically isotropic and transparent was prepared.

$R[-45,20](\lambda 1)$ and $R[-45,20](\lambda 2)$ were measured for the prepared decorative sheet 29 in accordance with the reflectance measuring method described above and in the same manner as above, $R[-45,20](\lambda 1)/R[-45,20](\lambda 2)$ was calculated. As a result, it has been fount $R[-45,20](\lambda 1)/R[-45,20](\lambda 2)=40.0$.

The decorative sheet 29 had sharpness in its lustrousness on the surface, and it was confirmed that the texture having high designability for a decorative use is realized.

Example 30

(Coating Solution for Cholesteric Liquid Crystal Layer Gm3)

A composition was prepared at the same ratio as the coating solution for a cholesteric liquid crystal layer Gm1 except that methyl ethyl ketone was changed to cyclopentanone, and used as a coating solution for a cholesteric liquid crystal layer Gm3.

(Formation of Patterned Cholesteric Liquid Crystal Reflection Layer)

The prepared coating solution for a cholesteric liquid crystal reflection layer Gm3 was loaded as an ink in an ink jet printer (JV 400 SUV, manufactured by Mimaki Engineering Co., Ltd.).

At this time, in the ejection setting of the ink droplet, the amount of solution per ink droplet was adjusted to be random in the range of 4 μl to 40 μl, and the droplet ejection interval of ink droplets was also adjusted to be random using a multidrop function of the ink jet printer.

Under this setting, the coating solution for a cholesteric liquid crystal reflection layer Gm2 is deposited in a shape of a picture as shown in FIG. 7 or FIG. 8 on the undercoat layer-attached transparent support 01 by the ink jet printer and dried at 95° C. for 60 seconds, cooled down to -7° C./s until reaching 25° C., and the coated solution was irradiated with ultraviolet rays at 25° C. with an ultraviolet irradiation apparatus at 500 mJ/cm$^2$ of ultraviolet rays, thereby preparing a patterned decorative sheet 30 of Example 30.

$R[-45,20](\lambda 1)$ and $R[-45,20](\lambda 2)$ were measured for the prepared decorative sheet 30 in accordance with the reflectance measuring method described above and in the same manner as above, $R[-45,20](\lambda 1)/R[-45,20](\lambda 2)$ was calculated. As a result, it has been fount $R[-45,20](\lambda 1)/R[-45,20](\lambda 2)=40.0$.

The decorative sheet 30 had sharpness in its lustrousness on the surface, and it was confirmed that the texture having high designability for a decorative use is realized.

In addition, the same effect was obtained even when using the one coated with the whole surface without patterned characters.

Example 31

Decorative sheet for liquid crystal display surface (liquid crystal display device)

(Preparation of Protective Film 1)

A cellulose acetate film was prepared with reference to the examples ([0267]-[0270]) of JP2012-018396A. The film was used to as a protective film 01.

(Preparation of λ/4 Retardation Plate)

With reference to the examples ([0272]-[0282]) of JP2012-018396A, a λ/4 retardation plate was prepared by using the protective film 01 as a support and forming an alignment film and an optically anisotropic layer. Re (550) and Rth (550) were 130 nm and -5 nm, respectively.

(Preparation of Linearly Polarizing Reflective Polarizer 1)

The prepared λ/4 retardation plate and the coated surface of the decorative sheet 1 prepared in Example 1 were laminated using SK Dyne (manufactured by Soken Chemical & Engineering Co., Ltd.) to prepare a linearly polarizing reflective polarizer 1 (composite film).

The direction of 45° counterclockwise with respect to the absorption axis of the front polarizing plate of the liquid crystal display was positione such that the direction of slow axis of the λ/4 retardation plate coincided with the absorption axis of the front polarizing plate of the liquid crystal display, and the linearly polarizing reflective polarizer 1 and the front polarizing plate of the liquid crystal display were laminated placing the λ/4 retardation plate side inward with SK Dyne (manufactured by Soken Chemical & Engineering Co., Ltd.) to prepare a liquid crystal display device.

In this liquid crystal display device, the color derived from the decorative sheet looked beautiful in the black display state of the liquid crystal display, and in the white display state the decorative sheet was transparent and unnoticeable.

Example 32

Reflection reduced decorative sheet (automobile interior material)

A linearly polarizing reflective polarizer 1 was positioned on the dashboard as an automobile interior material and then a glass plate assumed as windshield was installed such that the angle between the normal line of the dashboard and the normal line of the glass plate was 45°.

Further, after positioning the linearly polarizing light reflecting polarizer 1 such that the angle between the reflection axis of the linearly polarizing reflective polarizer 1 and the glass plate was 0° at the position where the straight line connecting the viewpoint of the observer and the front face of the glass plate and the plane formed by the vertical axis intersects on the linearly polarizing light reflecting polarizer 1, a P wave was made incident on the glass plate.

As a result, reflection derived from the linearly polarizing reflective polarizer 1 was not confirmed on the glass plate.

EXPLANATION OF REFERENCES 1, 26 Cholesteric liquid crystal layer
Undercoat layer
3, 24 Support
10 Decorative sheet

What is claimed is:

1. A decorative sheet comprising a cholesteric liquid crystal layer exhibiting wavelength-selective reflectivity,
    wherein the cholesteric liquid crystal layer has a striped pattern formed of a bright portion and dark portion in a cross-section observed by a scanning electron microscope, and the striped pattern has a wavy structure in which an average value of peak-to-peak distances is from 0.5 to 50 μm,
    the wavy structure is defined as a structure in which there is at least one region M in which the absolute value of an inclination angle in a continuous line formed by the bright portion or the dark portion of the striped pattern with respect to a plane of the cholesteric liquid crystal layer is 5° or more, and a peak or valley in which the region M is sandwiched by two points located closest to the region M with an inclination angle of 0° is specified,
    the peak-to-peak distance of the wavy structure is defined as a distance obtained by measuring distances between the peaks or valleys in which the region M is sandwiched by two points located closest to the region M with an inclination angle of 0° in a plane direction of the cholesteric liquid crystal layer, and arithmetically averaging the distances in the entire film thickness and a length of 100 μm in the longitudinal axis direction of a cross section of the cholesteric liquid crystal layer, and
    the cholesteric liquid crystal layer satisfies Expression (1):

$R[-45,20](\lambda1)/R[-45,20](\lambda2) \geq 5$  Expression (1)

$R[-45,20](\lambda)$ represents reflectance at a wavelength λ of incident light with a polar angle of −45° with respect to the decorative sheet, the reflectance being measured at a light-receiving angle expressed by a polar angle of 20° at an azimuthal angle shifted 180° from an azimuthal angle of the incident light,
    λ1 represents a peak wavelength of characteristic reflectance in a wavelength of 380 nm to 780 nm measured in such a manner that light is incident from a viewing-side surface of the decorative sheet, and
    λ2 is set to replace one of λ21 or λ22 (λ21=λ1+200 nm and λ22=λ1−200 nm) that results in a smaller value when R[−45,20](λ1) and R[−45,20](λ22) are compared to each other.

2. The decorative sheet according to claim 1, which satisfies Expression (2):

$R[-45,20](\lambda1)/R[-45,15](\lambda1) \leq 1.7$  Expression (2)

here, $R[-45,15](\lambda)$ represents reflectance at a wavelength λ of incident light with a polar angle of −45° with respect to the decorative sheet, the reflectance being measured at a light-receiving angle expressed by a polar angle of 15° at an azimuthal angle shifted 180° from an azimuthal angle of the incident light.

3. The decorative sheet according to claim 1 including a region A satisfying Expression (3) in a plane of the decorative sheet, $R_{max}[0,15](\lambda1)/R_{min}[0,15](\lambda1) \geq 1.3$  Expression (3)

here, $R_{max}[0,15](\lambda)$ and $R_{min}[0,15](\lambda)$ respectively represent maximum and minimum values of reflectance of incident light with a polar angle of 0° with respect to the decorative sheet, the reflectance being measured at a wavelength of λ and a light-receiving angle expressed by a polar angle of 15° at an azimuthal angle in a range of 0° to 360°.

4. The decorative sheet according to claim 3 further including a region B satisfying Expression (4) in a plane of the decorative sheet, $R_{max}[0,15](\lambda1)/R_{min}[0,15](\lambda1) \leq 1.1$  Expression (4)

here, $R_{max}[0,15](\lambda)$ and $R_{min}[0,15](\lambda)$ respectively represent maximum and minimum values of reflectance of incident light with a polar angle of 0° with respect to the decorative sheet, the reflectance being measured at a wavelength of λ and a light-receiving angle expressed by a polar angle of 15° at an azimuthal angle in a range of 0° to 360°.

5. The decorative sheet according to claim 1,
    wherein the decorative sheet is a sheet in which a maximum value of integral reflectance excluding a specular reflection component is 10% or more in the wavelength range of 380 nm to 780 nm.

6. The decorative sheet according to claim 1, wherein the cholesteric liquid crystal layer satisfies Expressions (5) and (6), $\alpha/\beta \geq 1.2$  Expression (5)

$\alpha \geq 2°$  Expression (6)

α and β represent two largest values among standard deviations of inclination angles within 1 μm in one of two surfaces of the cholesteric liquid crystal layer, and
    the inclination angle is defined as an angle between the fine line segment on a continuous line of the bright portion or the dark portion of the striped pattern and the normal direction of the cholesteric liquid crystal layer.

7. The decorative sheet according to claim 1,
    wherein a ratio of an internal haze value (Hi) to a total haze value (Ht) of the decorative sheet is 40% or more.

8. The decorative sheet according to claim 1,
    wherein the cholesteric liquid crystal layer has a surfactant.

9. The decorative sheet according to claim 1, which satisfies Expression (1-1), $R[-45,20](\lambda1)/R[-45,20](\lambda2) > 9$  Expression (1-1).

10. A liquid crystal display device comprising on a surface thereof a composite film including the decorative sheet according to claim 1 and a λ/4 retardation plate.

11. An automobile interior material comprising a composite film including the decorative sheet according to claim 1 and a λ/4 retardation plate.

12. A decorative sheet comprising a cholesteric liquid crystal layer exhibiting wavelength-selective reflectivity,
    wherein the cholesteric liquid crystal layer has a striped pattern formed of bright and dark portions observed in a cross section by a scanning electron microscope, at least one of the bright and dark portions is branched, and regarding branches of the bright and dark portions, there is a bright portion or dark portion having an end portion toward a branched portion between two bright or dark portions among three bright or dark portions extending from the branched portion, and in a case where a structure in which one bright or dark portion between the two bright or dark portions sandwiching the bright or dark portion having an end portion toward the branched portion is included is defined as a structure A, and a structure having three or more bright and dark portions is defined as a structure B, the number of the structures A and B included per a cross sectional area of 100 μm² of the cholesteric liquid crystal layer satisfies any one of Condition I or Condition II:

Condition I: The structure B is not included, and the number of the structure A included is 0.1 or more and less than 50

Condition II: The number of the structure B included is 0.1 or more and less than 10, the cholesteric liquid crystal layer satisfies Expression (1):

$$R[-45,20](\lambda 1)/R[-45,20](\lambda 2) \geq 5 \qquad \text{Expression (1)}$$

R[—45,20](λ) represents reflectance at a wavelength λ of incident light with a polar angle of −45° with respect to the decorative sheet, the reflectance being measured at a light-receiving angle expressed by a polar angle of 20° at an azimuthal angle shifted 180° from an azimuthal angle of the incident light, λ1 represents a peak wavelength of characteristic reflectance in a wavelength of 380 nm to 780 nm measured in such a manner that light is incident from a viewing-side surface of the decorative sheet, and λ2 is set to replace one of λ21 or λ22 (λ21=λ1+200 nm and λ22=λ1−200 nm) that results in a smaller value when R[−45,20](λ21) and R[−45,20](λ2) are compared to each other.

13. The decorative sheet according to claim 12, which satisfies Expression (1-1), $$R[-45,20](\lambda 1)/R[-45,20](\lambda 2) > 9 \qquad \text{Expression (1-1)}.$$

14. A liquid crystal display device comprising on a surface thereof a composite film including the decorative sheet according to claim 12 and a λ/4 retardation plate.

15. An automobile interior material comprising a composite film including the decorative sheet according to claim 12 and a λ/4 retardation plate.

* * * * *